(12) United States Patent
Rouxel et al.

(10) Patent No.: US 12,203,159 B2
(45) Date of Patent: Jan. 21, 2025

(54) METHOD FOR PRODUCING ALUMINUM-COPPER ALLOYS CONTAINING SCANDIUM

(71) Applicant: Universal Alloy Corporation, Canton, GA (US)

(72) Inventors: Baptiste Thomas Jean Rouxel, Paris (FR); Thomas Henri Dorin, Yarraville (AU); Timothy J. Langan, Catonsville, MD (US); Justin D. Lamb, Canton, GA (US)

(73) Assignee: Universal Alloy Corporation, Canton, GA (US)

( * ) Notice: Subject to any disclaimer, the term of this patent is extended or adjusted under 35 U.S.C. 154(b) by 249 days.

(21) Appl. No.: 17/728,663

(22) Filed: Apr. 25, 2022

(65) Prior Publication Data

US 2022/0341016 A1    Oct. 27, 2022

Related U.S. Application Data

(60) Provisional application No. 63/179,125, filed on Apr. 23, 2021.

(51) Int. Cl.
*C22F 1/057* (2006.01)
*C22C 21/14* (2006.01)
*C22C 21/16* (2006.01)

(52) U.S. Cl.
CPC .............. *C22F 1/057* (2013.01); *C22C 21/14* (2013.01); *C22C 21/16* (2013.01)

(58) Field of Classification Search
CPC ......... C22F 1/057; C22C 21/14; C22C 21/16; C22C 1/0416
See application file for complete search history.

(56) References Cited

U.S. PATENT DOCUMENTS 3,619,181 A    11/1971    Willey
4,711,762 A    12/1987    Vernam et al.
(Continued)

FOREIGN PATENT DOCUMENTS

DE    102007018123    10/2008
EP    0760727 A1    3/1993

OTHER PUBLICATIONS

B. Rouxel, M. Ramajayam and T.J. Langan et al.Materialia 9 (2020) 100610 (Year: 2020).*

(Continued)

*Primary Examiner* — Brian D Walck
*Assistant Examiner* — Nazmun Nahar Shams
(74) *Attorney, Agent, or Firm* — Alan G. Towner; Leech Tishman Fuscaldo & Lampl

(57) ABSTRACT

A method of producing a wrought aluminum alloy product is disclosed comprising Cu, Mn, Zr, Sc and Ti. The method includes casting an unwrought billet, ingot or shape from a liquid metal bath, and homogenizing the unwrought billet, ingot or shape at an equivalent time at temperature. The homogenization process includes first stage heating within a relatively low temperature range, second stage heating within an intermediate temperature range, and third stage heating at a relatively high temperature. After homogenizing, the billet, ingot or shape is worked into an extruded product, solution heat treated, quenched, stretched to a permanent set, and artificially aged. The extruded aluminum alloy product has desirable mechanical properties and electrical conductivity.

30 Claims, 21 Drawing Sheets

(56) References Cited

U.S. PATENT DOCUMENTS

| | | | |
|---|---|---|---|
| 4,772,342 | A | 9/1988 | Polmear |
| 5,211,910 | A | 5/1993 | Pickens et al. |
| 6,074,498 | A | 6/2000 | Waldron et al. |
| 7,048,815 | B2 | 5/2006 | Senkov et al. |
| 7,302,644 | B2 | 11/2007 | Holtz et al. |
| 7,704,333 | B2 | 4/2010 | Cho et al. |
| 8,277,580 | B2 | 10/2012 | Dangerfield et al. |
| 8,366,839 | B2 | 2/2013 | Heymes et al. |
| 10,724,127 | B2 | 7/2020 | Dangerfield et al. |
| 2014/0166161 | A1* | 6/2014 | Terlinde .......... C22C 21/14 148/552 |
| 2017/0335437 | A1 | 11/2017 | Shyam et al. |
| 2018/0363114 | A1 | 12/2018 | Welchel et al. |
| 2019/0032180 | A1 | 1/2019 | Dangerfield et al. |
| 2019/0071753 | A1 | 3/2019 | Eberl et al. |
| 2019/0233921 | A1 | 8/2019 | Long et al. |
| 2019/0249283 | A1 | 8/2019 | Langan et al. |

OTHER PUBLICATIONS

T. Sheppard, "Extrusion of Aluminium Alloys" p. 100-103 (Year: 1999).*

Liu Gang et al. [CN111455241A] (Machine Translation) (Year: 202).*

Clouet et al., "Complex Precipitation Pathways in Multicomponent Alloys", Nat. Mater., 2006, 5(6), p. 482-488.

Rioja et al., "The Evolution of Al-Li Base Products for Aerospace and Space Applications", Metallurgical and Materials Transactions A, vol. 43A, Sep. 2012, p. 3325-3337.

Belov et al., "Optimization of Phase Composition of Al-Cu-Mn-Zr-Sc Alloys for Rolled Products with Requirements for Solution Heat Treatment and Quenching", J. Alloys Compd., 2014, 583, p. 206-213.

Chong et al., "The influence of Sc solute partitioning on the microalloying effect and mechanical properties of Al-Cu alloys with minor Sc addition", Acta Materialia, Oct. 2016, p. 68-79.

Dorin et al., "Effect of Sc and Zr additions on the microstructure/strength of Al-Cu binary alloys", Materials Science & Engineering A 707 (2017) p. 58-64.

Dorin et al., "The Effect of Scandium and Zirconium on the Microstructure, Mechanical Properties and Formability of a Model Al-Cu Alloy", O. Martin, ed., TMS Annual Meeting & Exhibition, Mar. 11-15, 2018 (Phoenix), Springer, Cham, 2018, p. 233-239.

Mester et al., "Understanding the Co-Precipitation Mechanisms of Al3(Sc, Zr) with Strengthening Phases in Al- Cu-Li Model Alloys," O. Martin, ed., TMS Annual Meeting & Exhibition, Mar. 11-15, 2018 (Phoenix), Springer, Cham, 2018, p. 233-239.

Dorin et al., "Aluminum Scandium Alloys, Fundamentals of Aluminum Metallurgy", R. N. Lumley, ed., Woodhead Publishing, 2018, p. 439-494.

Dorin et al., "Micro-Segregation and Precipitates in As-Solidified Al-Sc-Zr-(Mg)-(Si)- (Cu) Alloys", Mater. Charact., 2019, 154, p. 353-362.

Kairy et al., "Simultaneous Improvement in Corrosion Resistance and Hardness of a Model 2xxx Series Al-Cu Alloy with the Microstructural Variation Caused by Sc and Zr", Corros. Sci., 2019, 158, p. 108095.

Gao et al., "Stabilizing Nanoprecipitates in Al-Cu Alloys for Creep Resistance at 300 °C", Mater. Res. Lett., 2019, 7 (1), p. 18-25.

Liang et al., "The Synergetic Effect of Si and Sc on the Thermal Stability of the Precipitates in AlCuMg Alloy", Mater. Sci. Eng. A, 2020, 783, p. 139319.

Lamb et al., "Novel Al-Cu-Mn-Zr-Sc Compositions Exhibiting Increased Mechanical Performance After a High- Temperature Thermal Exposure", Journal of Materials Engineering and Performance, 2020, 13 pages.

* cited by examiner

METHOD FOR PRODUCING ALUMINUM-COPPER ALLOYS CONTAINING SCANDIUM

CROSS-REFERENCE TO RELATED APPLICATION

This application claims the benefit of U.S. Provisional Patent Application No. 63/179,125 filed Apr. 23, 2021, which is incorporated herein by reference.

FIELD OF THE INVENTION

This invention relates to aluminum-copper wrought products containing scandium additions, and more particularly to Al—Cu—Sc—Zr—Mn compositions subjected to processing methods that produce extruded products having improved combinations of properties.

BACKGROUND INFORMATION

Wrought aluminum alloys have long been utilized by the aerospace industry due to their high specific strength. However, their use in applications such as near-engine components and other applications requiring high temperature performance is limited since conventional aluminum alloys generally exhibit strength loss at, or after exposure to, elevated temperatures. As new generation jet engines generally run hotter than their historical counterparts, this has forced aircraft manufacturers to use more titanium in aircraft construction, increasing cost. There exists a need for aluminum alloys with improved high thermal exposure performance.

SUMMARY OF THE INVENTION

An aspect of the present invention is to provide a method of producing a wrought aluminum alloy product comprising from 4.5 to 6.75 weight percent Cu, from 0.1 to 0.6 weight percent Mn, from 0.05 to 0.25 weight percent Zr, from 0.02 to 0.20 weight percent Sc, wherein the Sc content is less than or equal to the Zr content, from 0.01 to 0.15 weight percent Ti, up to 0.30 weight percent Fe, up to 0.25 weight percent Mg, up to 0.20 weight percent Si, less than 0.05 weight percent Ag, less than 0.05 weight percent V, less than 0.05 weight percent Ni, less than 0.05 weight percent Li, and the balance aluminum and incidental impurities. The method comprises casting an unwrought billet, ingot or shape from a liquid metal bath, and homogenizing the unwrought billet, ingot or shape at an equivalent time at temperature determined by an equation:

$$\frac{t_1}{t_2} = \exp\left[\frac{Q}{R}\left(\frac{1}{T_1} - \frac{1}{T_2}\right)\right]$$

where $t_1$ and $t_2$ are times in hours, $T_1$ and $T_2$ are temperatures converted to degrees Kelvin, Q is the activation energy using a Q=125.6 kJ/mol and R is the universal gas constant using R=8.314462 JK$^{-1}$ mol$^{-1}$. The homogenization process includes first stage heating within a temperature range of from 400° F. to 620° F. such that a first equivalent time at $T_1$ 995° F. (808.15K) is between 0.0001 and 0.036 hours, second stage heating within a temperature of from 790° F. to 870° F. such that a second equivalent time at $T_1$ 995° F. is between 0.4 and 6.0 hours, and third stage heating at a temperature greater than 950° F. such that a third equivalent time at $T_1$ 995° F. for the total first, second and third stages of the homogenization is between 5.75 and 65 hours. After homogenizing, the method further comprises hot working the homogenized billet, ingot or shape into an extruded product, solution heat treating the wrought body at a temperature greater than or equal to 950° F. and subsequently quenching the wrought product, stretching the product to a permanent set of from 0.5 to 5 percent, and artificially aging the product at a temperature of from 200° F. to 425° F. In one embodiment, the extruded aluminum alloy product has a longitudinal tensile yield strength of at least 47 ksi and an electrical conductivity greater than 34.5% IACS. In another embodiment, the extruded aluminum alloy product has a longitudinal ultimate tensile strength greater than 65 ksi, a longitudinal tensile yield strength greater than 50 ksi, and a longitudinal elongation at failure greater than 7%.

Another aspect of the present invention is to provide a wrought aluminum alloy product comprising from 4.5 to 6.75 weight percent Cu, from 0.1 to 0.6 weight percent Mn, from 0.05 to 0.25 weight percent Zr, from 0.02 to 0.20 weight percent Sc, from 0.01 to 0.15 weight percent Ti, up to 0.30 weight percent Fe, up to 0.25 weight percent Mg, up to 0.20 weight percent Si, and the balance aluminum and incidental impurities wherein the Ag, V, and Ni content is less than 0.05 weight percent each. In one embodiment, the extruded aluminum alloy product has a longitudinal tensile yield strength of at least 47 ksi and an electrical conductivity greater than 34.5% IACS. In another embodiment, the extruded aluminum alloy product has a longitudinal ultimate tensile strength greater than 65 ksi, a longitudinal tensile yield strength greater than 50 ksi, and a longitudinal elongation at failure greater than 7%.

These and other aspects of the present invention will be more apparent from the following description.

DETAILED DESCRIPTION

The present invention relates to aluminum-copper compositions containing Sc and methods of manufacture thereof resulting in wrought products with an improved combination of mechanical properties. In particular, the present invention relates to aluminum-copper alloys compositions containing controlled additions of Mn, Zr and Sc, and methods of manufacture thereof, resulting in an improved combination of properties without the requirement of Ni, V, Ag, Li or combinations thereof. The alloys of the present invention may display enhanced mechanical properties at, and/or after exposure to, high temperatures.

Figure 1:
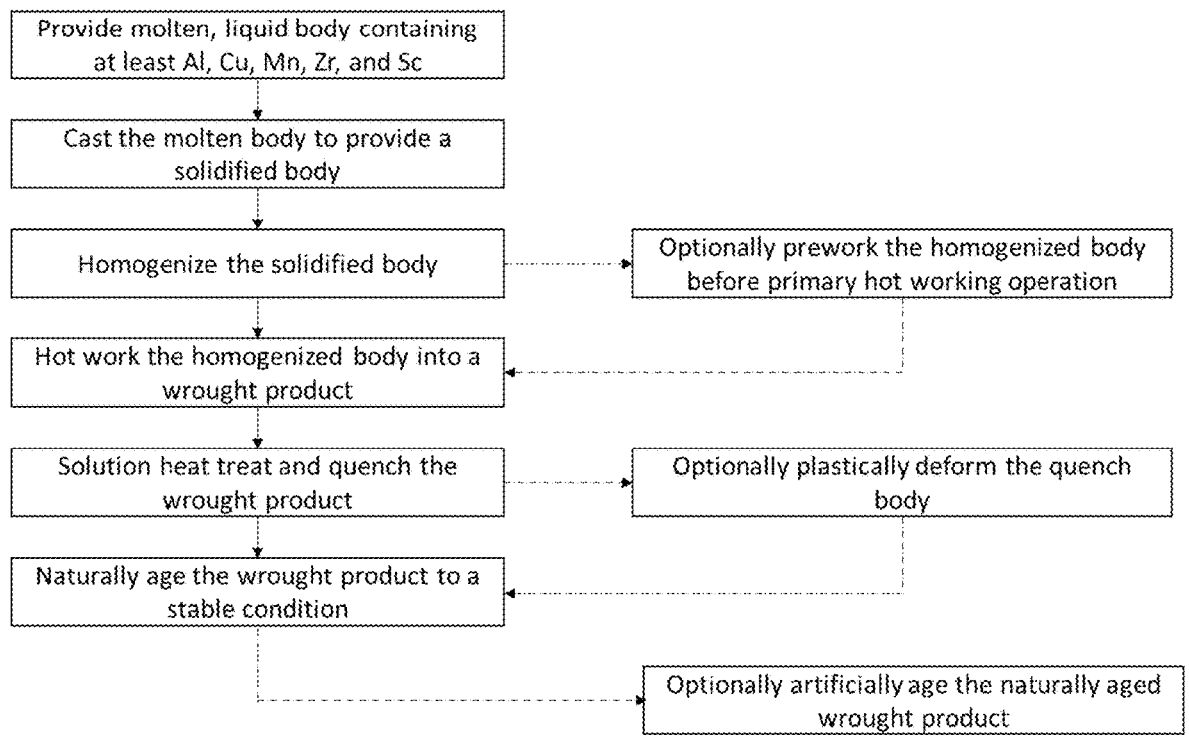
FIG. 1 is a schematic diagram illustrating a manufacturing process of the invention.

The present invention provides a method suitable for producing wrought aluminum-based alloys containing Cu and Sc via extrusion, rolling, forging or a combination thereof, having an improved resistance to mechanical property degradation after high temperature thermal exposure. Generally, the method, which can be seen schematically in FIG. 1, may comprise of casting a billet, ingot or shape with the critical combination of alloying components detailed herein; followed by homogenizing the billet, ingot or shape; followed by a thermomechanical plastic deformation process such as extrusion, rolling, forging or combination thereof to produce a wrought alloy product; followed by solution heat treating and quenching the wrought alloy product; optionally followed by stretching the wrought product; and lastly, optionally followed by artificially aging the wrought product if high temperature performance is desired.

More specifically, the alloys of the present invention may be produced by preparing a liquid metal bath having a chemical composition in accordance with an embodiment detailed herein. The liquid metal bath is then solidified into a billet, ingot or shape via casting techniques known to those skilled in the art such as direct-chill (DC) casting or mold casting.

Unless otherwise specified, all references to chemical composition of the alloy described herein are expressed as percentages by weight based upon the total weight of the alloy, which is often referred to as 'weight percent' or 'wt. %'. The alloys, when applicable, are named in accordance with the regulations of The Aluminum Association, known to those skilled in the art. The density of an alloy is dependent on its composition and can be calculated, when not physically measured, in accordance with the procedure described in "Aluminum Standards and Data 2017," a publication of The Aluminum Association, on paged 2-13 through 2-15. The definitions of many common temper designations are also given in "Aluminum Standards and Data 2017" on pages 1-6 through 1-10.

As used herein, the term "substantially free" when referring to alloying additions, means that a particular element or material is not purposefully added to the alloy, and is only present, if at all, in minor amounts as an impurity. For example, in amounts of less than 0.05 weight percent, preferably 0.01 weight percent or less.

The alloys of the present invention may typically comprise, in weight percent, 4.5-6.75 Cu, 0.1-0.6 Mn, 0.25 max Mg, 0.20 max Si, 0.30 max Fe, 0.01-0.15 Ti, 0.05-0.25 Zr, 0.02-0.2 Sc, 0.05 max Ag, 0.05 max V, 0.05 max Ni, and 0.01 max Li with the remainder being aluminum and minor impurities.

In certain embodiments, the alloys of the present invention may comprise of, in weight percent, 4.75-6.7 Cu, 0.2-0.5 Mn, 0.15 max Mg, 0.18 max Si, 0.25 max Fe, 0.01-0.10 Ti, 0.06-0.20 Zr, 0.03-0.15 Sc, 0.03 max Ag, 0.03 max V, and 0.03 max Ni with the remainder being aluminum and minor impurities.

An embodiment of the alloys of the present invention may comprise of, in weight precent, 4.9-6.7 Cu, 0.2-0.5 Mn, 0.10 max Mg, 0.15 max Si, 0.22 max Fe, 0.01-0.08 Ti, 0.06-0.18 Zr, 0.03-0.12 Sc, 0.01 max Ag, 0.01 max V, and 0.01 max Ni with the remainder being aluminum and minor impurities.

Another embodiment of the alloys of the present invention may comprise of, in weight precent, 5.0-6.6 Cu, 0.2-0.5 Mn, 0.05 max Mg, 0.10 max Si, 0.15 max Fe, 0.01-0.05 Ti, 0.08-0.14 Zr, and 0.04-0.08 Sc with the remainder being aluminum and minor impurities such that the alloys are substantially free of Ag, V, and Ni.

Such alloy compositions are summarized in Table 1 as Alloys I-IV.

TABLE 1

| Alloy | Cu | Mn | Mg | Si | Fe | Ti | Zr | Sc | Ag | V | Ni | Li |
|---|---|---|---|---|---|---|---|---|---|---|---|---|
| I | 4.5-6.75 | 0.1-0.6 | 0.25 max | 0.20 max | 0.30 max | 0.01-0.15 | 0.05-0.25 | 0.02-0.2 | 0.05 max | 0.05 max | 0.05 max | 0.01 max |
| II | 4.75-6.7 | 0.2-0.5 | 0.15 max | 0.18 max | 0.25 max | 0.01-0.10 | 0.06-0.20 | 0.03-0.15 | 0.03 max | 0.03 max | 0.03 max | — |
| III | 4.9-6.7 | 0.2-0.5 | 0.10 max | 0.15 max | 0.22 max | 0.01-0.08 | 0.06-0.18 | 0.03-0.12 | 0.01 max | 0.01 max | 0.01 max | — |

TABLE 1-continued

| Alloy | Cu | Mn | Mg | Si | Fe | Ti | Zr | Sc | Ag | V | Ni | Li |
|---|---|---|---|---|---|---|---|---|---|---|---|---|
| IV | 5.0-6.6 | 0.2-0.5 | 0.05 max | 0.10 max | 0.15 max | 0.01-0.05 | 0.08-0.15 | 0.04-0.08 | — | — | — | — |

In the present invention, Cu additions, particularly in the ranges set forth herein for use in accordance with the present invention, are important for increasing strength while maintaining good fracture toughness. Cu contents over 7.0 wt. % should be avoided as proper homogenization becomes difficult as known those skilled in the art. Likewise, although such alloys can be improved via the processing and other compositional guidelines presented herein, Cu contents less than 4.0 wt. % should be avoided as such compositions would result in a lower strength product. Therefore, in accordance with the present invention, the Cu content may be within a range of from 4.5 to 6.75 wt. %.

Additions of Sc and Zr are added as grain structure controlling elements. Zr and Sc, which have peritectic and eutectic reactions with aluminum, respectively, form dispersoids in aluminum alloys. When combined in aluminum alloys, they tend to form complex dispersoids whose stoichiometry is often roughly given as $Al_3(Zr_x, Sc_{1-x})$ with x varying from 0 to 1, although it will be appreciated that the exact composition of the dispersoids can vary. Herein, the complex dispersoids may be simply referred to $Al_3(Zr, Sc)$ dispersoids. Typically, the Zr content of the present alloys should be greater than or equal to the Sc content.

Additions of Mn are added to the wrought aluminum product as they appear to have a surprising effect on the overall mechanical performance of the product, especially after high temperature thermal exposure.

While the inventors do not wish to be held to any theory of invention, it is believed that the unique combination of properties exhibited by the alloys of the present invention stem from an interaction between θ-type precipitates and the $Al_3(Zr, Sc)$ dispersoids, which refines the microstructure therein compared to a Sc-free microstructure given an equal amount of cold work. The Mn additions then stabilize the refined θ precipitates during high temperature thermal exposure.

Additions of Ti act as a grain refiner during the casting operation. Titanium may typically be added in conjunction with B or C to form titanium boride and/or carbide. However, it should be noted that B may poison dispersoid forming elements like Zr. Therefore, B content and dwell times after grain refining with TiB should be carefully monitored.

The wrought alloy products of the present invention may be substantially free of V and Ni. Both elements are commonly added to aluminum alloys used in high temperature applications like AA2219 and AA2618, respectively. Surprisingly, V- and Ni-free alloys of the present invention still maintain good resistance to high temperature thermal exposure.

Furthermore, care must be taken not form primary intermetallics in the microstructure. Intermetallics have been found to form upon solidification when the composition of an alloy contains critical amounts of Cr, V, Ti, Mn, Fe and/or Zr. While the inventors do not wish to be held to any theory of invention, it is believed that Sc additions should be carefully controlled in conjunction with Cr, V, Ti, Mn, Fe and/or Zr, as they would likely increase the propensity of an alloy to form primary intermetallics.

Wrought aluminum-copper alloy products of the invention may be substantially free of Ag, which can add significant raw material cost. Although several prior art disclosures claim increased high temperature performance with silver additions, the alloys of the present invention may be Ag-free and still display good high temperature performance.

The wrought aluminum-copper alloy products of this invention may be substantially free of Li, which can be a significant material cost.

Minor Mg additions may also be optionally used to increase strength. If Mg additions are added, Mg levels should be controlled as to not promote S-type precipitates, generally given as $Al_2CuMg$, over θ-type precipitates known to be the primary precipitate in the microstructure.

Once the alloy of the invention has been solidified, the cast product should be homogenized, although a known prior stress relief may optionally be performed if desired as long as it does not overly coarsen the Sc dispersoids. Therefore, any suitable stress relief operation may be conducted at or below the first step homogenization temperatures detailed herein.

In the preparation of wrought products using the alloy composition of the present invention, the following method may be followed to order to obtain a wrought alloy product with the desired combination of properties. It will be appreciated by those skilled in the art that slight alterations to certain processing steps may be made to tailor the alloy product to certain applications. Equivalent homogenization and aging times may be used when multi-step homogenization and aging practices are utilized. An equivalent time at temperature during homogenization or aging is given by the following equation:

$$\frac{t_1}{t_2} = \exp\left[\frac{Q}{R}\left(\frac{1}{T_1} - \frac{1}{T_2}\right)\right]$$

where $t_1$ and $t_2$ are times in hours, $T_1$ and $T_2$ are temperatures converted to degrees Kelvin, Q is the activation energy, and R is the universal gas constant. Sheppard, T., *Extrusion of Aluminum Alloys*, Springer Science and Business Media (1999).

Principal goals of the homogenization process are to precipitate out a desired network of dispersoids, which help control and refine the grain structure, and to homogenize the other alloying elements. The cast product may be homogenized via a discrete multi-step process such that at least one step, or alternatively a slow ramp, is performed at a first stage between 400° F. and 620° F. such that the equivalent time at $T_1$ 995° F. (808.15K) using a Q=125.6 kJ/mol and R=8.314462 $JK^{-1}$ $mol^{-1}$ is between 0.0001 and 0.036 hours, one step is performed at a second stage between 790° F. and 870° F. such that the equivalent time at $T_1$ 995° F. is between 0.4 and 6 hours, and at least one step is performed at a third stage greater than 950° F., such that the total equivalent time of the entire homogenization process is between 5.75 and 65 hours. Longer homogenization times at these temperatures can be used as long as the dispersoids are not coarsened.

While the inventors do not wish to be held to any theory of invention, it is believed the multi-stage homogenization process described herein facilitates the formation of complex, core-shell dispersoids, with Sc at the core and Zr forming a protective shell to slow dispersoid coarsening during subsequent processing. It is believed that the first homogenization step or stage between 400° F. and 620° F. precipitates a fine dispersion of Sc dispersoids. The protective Zr shell is then believed to be formed during the second step or stage (790-870° F.). Since Sc forms a eutectic with Al, and Zr forms a peritectic with Al, the distribution of the core-shell dispersoids, and the stoichiometric ratio, may change from the grain boundary to the center of a given grain. Higher homogenization stages are then homogenize other alloying additions such as Cu. The final homogenization steps or stages may depend on the exact Cu content and the size of the billet or ingot being homogenized. Care should be taken to avoid overly hot or lot homogenization practices as the dispersoids may coarsen and lose their effectiveness.

After being homogenized, the billet can be optionally extruded, rolled, forged or otherwise worked to produce stock suitable for shaping into an end product. For example, forging stock is sometimes extruded prior to forging as known to those skilled in the art.

After being homogenized, and optionally pre-worked, the alloy product is subjected to a thermomechanical deformation process, known as hot working, such as extrusion, rolling or forging to form a wrought F-temper product by techniques known to those skilled in the art. The alloy may typically be hot extruded into a wrought product. Prior to extrusion, a billet or ingot of the present alloy may be pre-heated to a temperature between 600° F. and 950° F. prior to extrusion.

Following the primary hot working operation, the product may be solution heat treated at a temperature greater than or equal to 950° F., but less than the incipient melting temperature. The solution heat treatment may depend on the Cu content chosen. Typical furnace ranges from a set point can be as high as ±10° F. for certain classes of furnaces as known to those skilled in the art. In order to produce the product of the invention, it is necessary to quench the alloy after solution heat treatment in order to minimize, and preferably prevent, uncontrolled precipitation of phases in the alloy.

After quenching, the alloy may be optionally plastically deformed, also known as cold worked, typically via stretching, drawing or cold rolling to an amount great enough to achieve the desired properties. Higher stretch percentages may lead to higher strength levels in the Al—Cu alloys. An extruded product may be stretched between 1% and 9%, for example, between 1% and 5%, or between 2% and 5%. A rolled product may be cold worked via cold rolling, stretching or combination thereof up to 22%. Cold work can affect precipitation kinetics, and therefore artificial aging practices may need to be adjusted to account for different stretch percentages. Typically, higher levels of cold work result in shorter aging times at a given temperature.

After the product has been quenched from solution heat treatment and optionally cold worked, it can be naturally aged until a stable temper has been established. Although this may occur any time after being quenched, it is typical to wait at least 48 hours before testing.

The alloy product may optionally be artificially aged to provide desired mechanical properties. For example, single or multi-step age practices between 200° F. and 425° F. can be utilized and may depend on the alloy composition as known those skilled in the art. It should be noted that typical furnace ranges from a set point for age ovens can be as high as ±10° F. for certain classifications of ovens as known to those skilled in the art.

The extruded aluminum alloy products of the present invention may typically have a longitudinal tensile yield strength of at least 47 ksi and an electrical conductivity greater than 34.5% IACS. For example, the longitudinal tensile yield strength may be at least 48 ksi, or at least 49 ksi, or at least 50 ksi, and the electrical conductivity may be greater than 35% IACS, or greater than 36% IACS, or greater than 37% IACS. Furthermore, the extruded aluminum alloy products may typically have a longitudinal ultimate tensile strength of greater than 65 ksi, a longitudinal tensile yield strength greater than 50 ksi, and a longitudinal elongation at failure greater than 7%

Unless otherwise specified, static mechanical properties, e.g., ultimate tensile strength (UTS), tensile yield strength (TYS) and the elongation at fracture (e), were determined by tensile tests according to ASTM B557—Standard Test Methods for Tension Testing Wrought and Cast Aluminum- and Magnesium-Alloy Products.

Unless otherwise specified, Vickers hardness tests were performed according to ASTM E92—Standard Test Methods for Vickers Hardness and Knoop Hardness of Metallic Materials.

Unless otherwise specified, Rockwell hardness tests were performed according to ASTM E18—Standard Test Methods for Rockwell Hardness of Metallic Materials.

Unless otherwise specified, electrical conductivity measurements were taken according to ASTM E1004—Standard Test Method for Determining Electrical Conductivity Using the Electromagnetic (Eddy Current) Method.

Unless otherwise specified, references to room temperature testing refer to testing performed at temperatures between 50° F. and 100° F., and preferably between 65° F. and 75° F.

Unless otherwise specified, high temperature thermal exposures refer to a process in which a body is exposed to an elevated temperature between 100° F. and 800° F. for a given amount of time before being cooled down to room temperature and subsequently tested. As the temperature to which a body is exposed is known to affect mechanical properties, the specific temperatures at which bodies are exposed are given herein in the specific examples.

Unless otherwise specified, Transmission Electron Microscopy (TEM) samples were prepared by manually grinding small discs down to a thickness of 80 μm before chemically milling them in TenuPol using a 30% nitric acid, 70% methanol solution at −22° F. (−30° C.). TEM was performed on a Joel 2100F in Scanning Transmission Electron Microscopy (STEM) mode while operating at 200 kV. Images were taken in the [−100] zone axis such that θ-type precipitates could be seen on edge as known to those skilled in the art. Energy Dispersive X-Ray (EDX) analysis was also conducted in the Joel 2100F using a Joel Si(Li) detector operating at 200 kV with a probe size of 0.5 nm.

Unless otherwise specified, differential scanning calorimetry (DSC) analysis was carried out using a scan rate of 10° C./min from 212° F. (100° C.) to 1067° F. (575° C.).

It will be recognized that the mechanical properties of an extruded product can be highly shape dependent. Therefore, the properties of the product disclosed herein may vary from shape to shape as known to those moderately skilled in the art.

The wrought aluminum-copper alloy products of this invention may be suitable for aerospace applications. For example, the aluminum-copper alloy products of this invention may be suitable for structural aerospace components such as, but not limited to: wing skins, engine containment rings, integrally stiffened panels, and near engine components.

The wrought aluminum-copper alloy production of this invention may be suitable for use on supersonic aircraft. The wrought aluminum-copper alloy products of this invention may be suitable for applications requiring increased ballistic performance. The wrought aluminum-copper alloy product of this invention may be suitable for cryogenic applications. The wrought aluminum-copper alloy products of this invention may also be suitable for applications requiring welding, friction stir welding, or friction pull plug welding.

The alloys manufactured from the present invention may act as suitable substrates for additive manufacturing. Furthermore, the alloy compositions disclosed herein may be suitable for use in additive manufacturing process as powder, wire or rods.

The term additive manufacturing generally refers to a process of joining materials to make an object, usually layer by layer, as opposed to subtractive manufacturing technologies, and is defined by ASTM F2792. However, the term is expanded herein to encompasses various manufacturing and prototyping techniques, including 3D printing, freeform fabrication, rapid prototyping, etc. Herein, additive manufacturing techniques entail any of the methods described in ASTM F2792, techniques which build material structures via frictional forces, or techniques which build material structures via welding techniques.

Conventionally, Aluminum Association registered alloys AA2618, AA2618A, AA2219, AA2319, AA2419 and AA2519 are known by those skilled in the art to exhibit good mechanical properties at, and after exposure to, high temperatures. Alloys belonging to the 2618-family contain high amounts of Fe and Ni as can be seen in Table 2. Alloys belong to the 2×19-family contain meaningful V additions as can also be seen in Table 2. These alloying additions, which can be detrimental to material properties such as conductivity and fracture toughness, create recyclability issues as they cannot generally be used as charge materials during casting for other aerospace grade alloys. Therefore, a more desirable product would maintain good properties after high temperature thermal exposures while being essentially Ni- and V-free with Fe levels typical of other aerospace grade aluminum alloys.

TABLE 2

Registered Aluminum Association compositional ranges for several commercial alloys used in high temperature applications.

| Alloy | Si | Fe | Cu | Mn | Mg | Ni | Zn | Ti | V | Zr |
|---|---|---|---|---|---|---|---|---|---|---|
| AA2618 | 0.10-0.25 | 0.9-1.3 | 1.9-2.7 | — | 1.3-1.8 | 0.9-1.2 | 0.10 | 0.04-0.10 | — | — |
| AA2618A | 0.15-0.25 | 0.9-1.4 | 1.8-2.7 | 0.25 | 1.2-1.8 | 0.8-1.4 | 0.15 | 0.20 | — | —[1] |
| AA2219 | 0.20 | 0.30 | 5.8-6.8 | 0.20-0.40 | 0.02 | — | 0.10 | 0.02-0.10 | 0.05-0.15 | 0.10-0.25 |
| AA2319 | 0.20 | 0.30 | 5.8-6.8 | 0.20-0.40 | 0.02 | — | 0.10 | 0.10-0.20 | 0.05-0.15 | 0.10-0.25 |
| AA2419 | 0.15 | 0.18 | 5.8-6.8 | 0.20-0.40 | 0.02 | — | 0.10 | 0.02-0.10 | 0.05-0.15 | 0.10-0.25 |
| AA2519 | 0.25[2] | 0.30[2] | 5.3-6.4 | 0.10-0.50 | 0.05-0.40 | — | 0.10 | 0.02-0.10 | 0.05-0.15 | 0.10-0.25 |

[1] Zr + Ti 0.25
[2] Si + Fe 0.40

The following examples are intended to illustrate various aspects of the present invention, and are not intended to limit the scope of the invention.

EXAMPLE 1

In this example, several billets of Al—Cu having compositions listed in Table 3 were cast. Alloy J3 is an embodiment of an alloy of the present invention. It should be noted J12 represents an alloy falling within the registered Aluminum Association ranges of AA2219 and AA2419. J13 represents an alloy with a 2×19-type composition with a meaningful Sc addition. Both alloys have significant V additions (0.12 wt. %).

TABLE 3

Results of compositional chemical analysis of billets in wt. %

| Alloy | Si | Fe | Cu | Mn | Mg | Cr | Ni | Zn | Ti | Zr | Sc | V | Ag | Density (lbs/in³) |
|---|---|---|---|---|---|---|---|---|---|---|---|---|---|---|
| J1 | 0.06 | 0.13 | 6.91 | 0.00 | 0.00 | 0.00 | 0.02 | 0.00 | 0.03 | 0.01 | 0.01 | 0.01 | 0.00 | 0.103 |
| J2 | 0.05 | 0.13 | 6.81 | 0.00 | 0.00 | 0.00 | 0.01 | 0.00 | 0.02 | 0.11 | 0.06 | 0.01 | 0.00 | 0.103 |
| J3 (Inv) | 0.08 | 0.12 | 6.52 | 0.30 | 0.00 | 0.00 | 0.01 | 0.01 | 0.02 | 0.15 | 0.06 | 0.01 | 0.00 | 0.103 |

TABLE 3-continued

Results of compositional chemical analysis of billets in wt. %

| Alloy | Si | Fe | Cu | Mn | Mg | Cr | Ni | Zn | Ti | Zr | Sc | V | Ag | Density (lbs/in³) |
|---|---|---|---|---|---|---|---|---|---|---|---|---|---|---|
| J4 | 0.06 | 0.43 | 6.31 | 0.01 | 0.00 | 0.00 | 0.01 | 0.00 | 0.02 | 0.12 | 0.05 | 0.01 | 0.01 | 0.102 |
| J5 | 0.06 | 0.14 | 6.70 | 0.00 | 0.00 | 0.00 | 0.01 | 0.00 | 0.02 | 0.11 | 0.06 | 0.10 | 0.00 | 0.103 |
| J6 | 0.05 | 0.13 | 6.55 | 0.00 | 0.00 | 0.00 | 0.00 | 0.01 | 0.02 | 0.25 | 0.06 | 0.01 | 0.00 | 0.102 |
| J7 | 0.06 | 0.12 | 6.34 | 0.00 | 0.00 | 0.00 | 0.30 | 0.00 | 0.02 | 0.11 | 0.06 | 0.01 | 0.00 | 0.102 |
| J8 | 0.05 | 0.13 | 6.74 | 0.00 | 0.00 | 0.19 | 0.01 | 0.00 | 0.02 | 0.12 | 0.06 | 0.01 | 0.00 | 0.103 |
| J9 | 0.07 | 0.14 | 6.93 | 0.00 | 0.01 | 0.00 | 0.02 | 0.01 | 0.02 | 0.14 | 0.06 | 0.02 | 0.20 | 0.103 |
| J12 | 0.05 | 0.14 | 6.73 | 0.35 | 0.00 | 0.00 | 0.01 | 0.00 | 0.02 | 0.13 | 0.00 | 0.12 | 0.00 | 0.103 |
| J13 | 0.05 | 0.14 | 6.13 | 0.30 | 0.02 | 0.00 | 0.01 | 0.00 | 0.02 | 0.13 | 0.06 | 0.12 | 0.00 | 0.102 |

Figure 2:
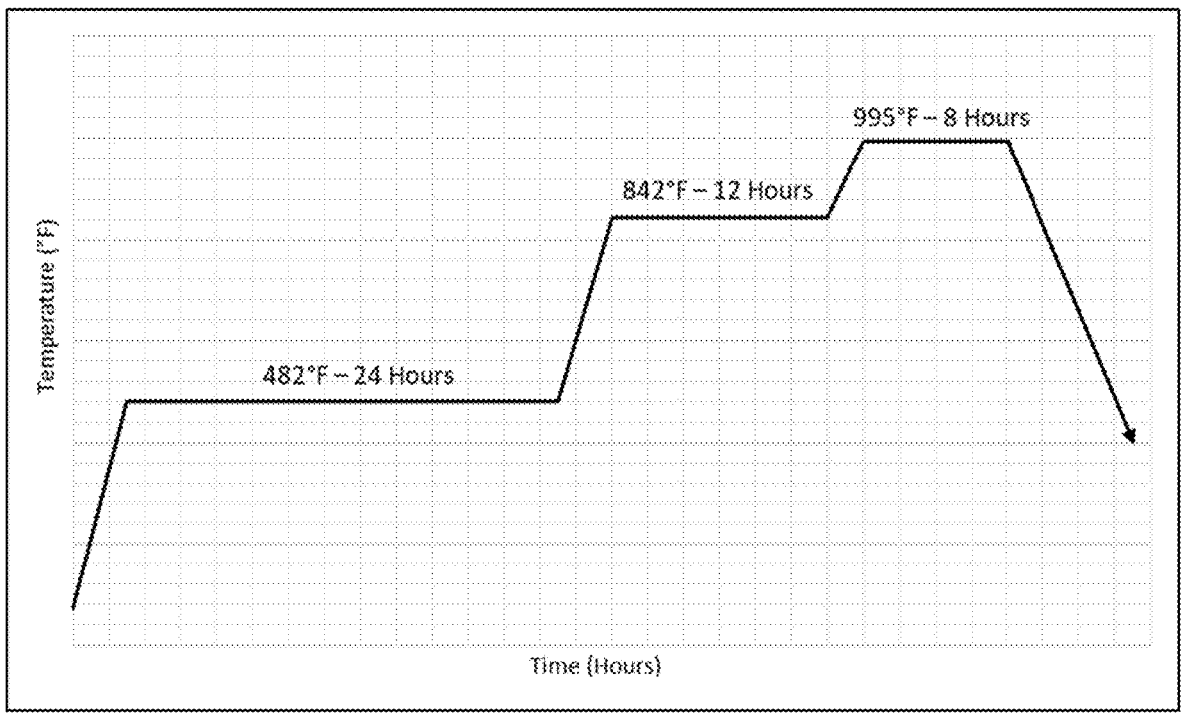
FIG. 2 is a partially schematic time vs. temperature graph illustrating a homogenization practice used in accordance with a manufacturing process of this invention.

The billets were then homogenized according to practice H1 shown in Table 4. Homogenization practice H1 represents a multi-step process consisting of a first step at 482° F. for 24 hours followed by a second step at 842° F. for 12 hours followed by a final step at 995° F. for 8 hours. A schematic illustration of the homogenization process can be seen in FIG. 2.

TABLE 4

Homogenization Practices

| ID | Step 1 | Step 2 | Step 3 |
|---|---|---|---|
| H1 | 482° F. - 24 Hours | 842° F. - 12 Hours | 995° F. - 8 Hours |

The homogenized billets were then subjected to hot extrusion to obtain wrought 0.21-inch rod F-temper sections. The F-temper sections were then solution heat treated, quenched, stretched, and aged according to one of the post-thermomechanical deformation processes listed in Table 5. It should be noted that for each post-thermomechanical deformation process listed in Table 5 that the extruded sections were held at the solution heat treatment temperature for 1 hour prior to being rapidly quenched in agitated water. Herein, test samples are identified by Alloy-Homogenization-Post-Thermomechanical Deformation Process. For example, alloy J1 homogenized according to practice H1 and processed after being extruded per Post-Thermomechanical Deformation Process P2 would be identified as "J1-H1-P2."

TABLE 5

Post-Thermomechanical Deformation Processing Parameters

| Process ID | Solution Heat Treatment | Stretch (%) | Minimum Room Temperature Aging Time | Artificial Aging Practice | Thermal Exposure |
|---|---|---|---|---|---|
| P1 | 995° F. | 3.0 | 72 Hours | 375° F. - 18 Hours | — |
| P2 | 995° F. | 3.0 | 72 Hours | 375° F. - 18 Hours | 536° F. - 24 Hours |

Figure 3:
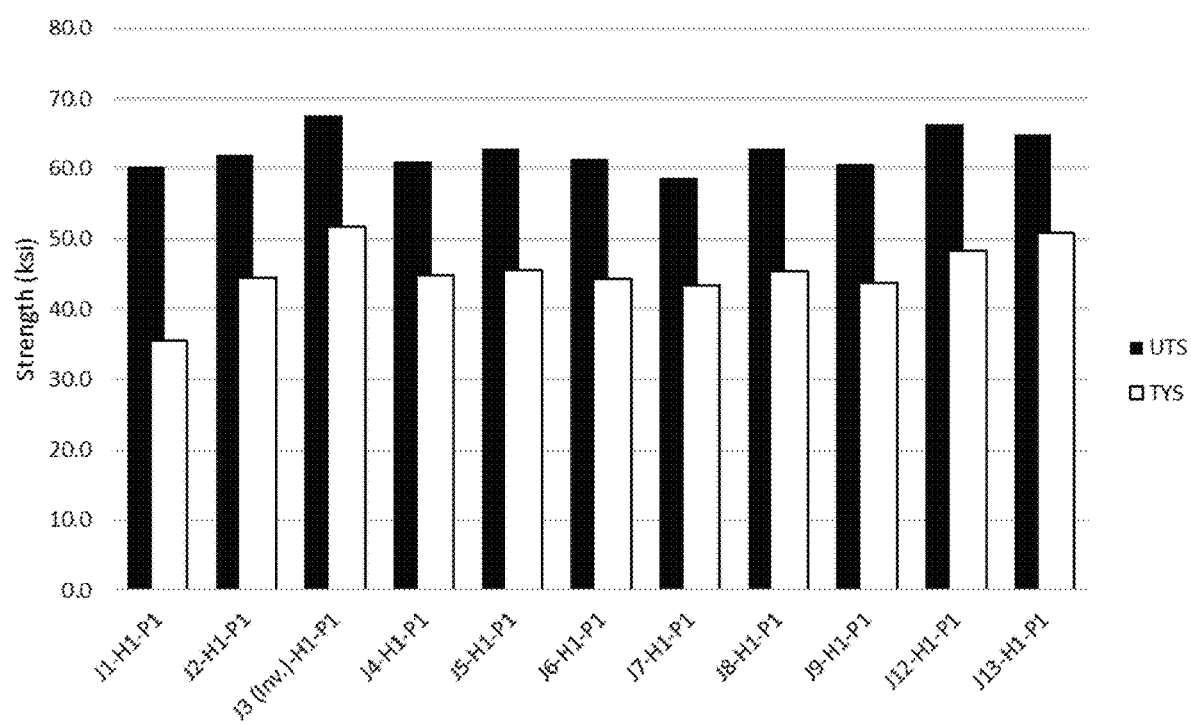
FIG. 3 is a graph of tensile strengths (UTS and TYS) for alloys tested in Example 1 after undergoing post-thermomechanical deformation process P1.
Figure 4:
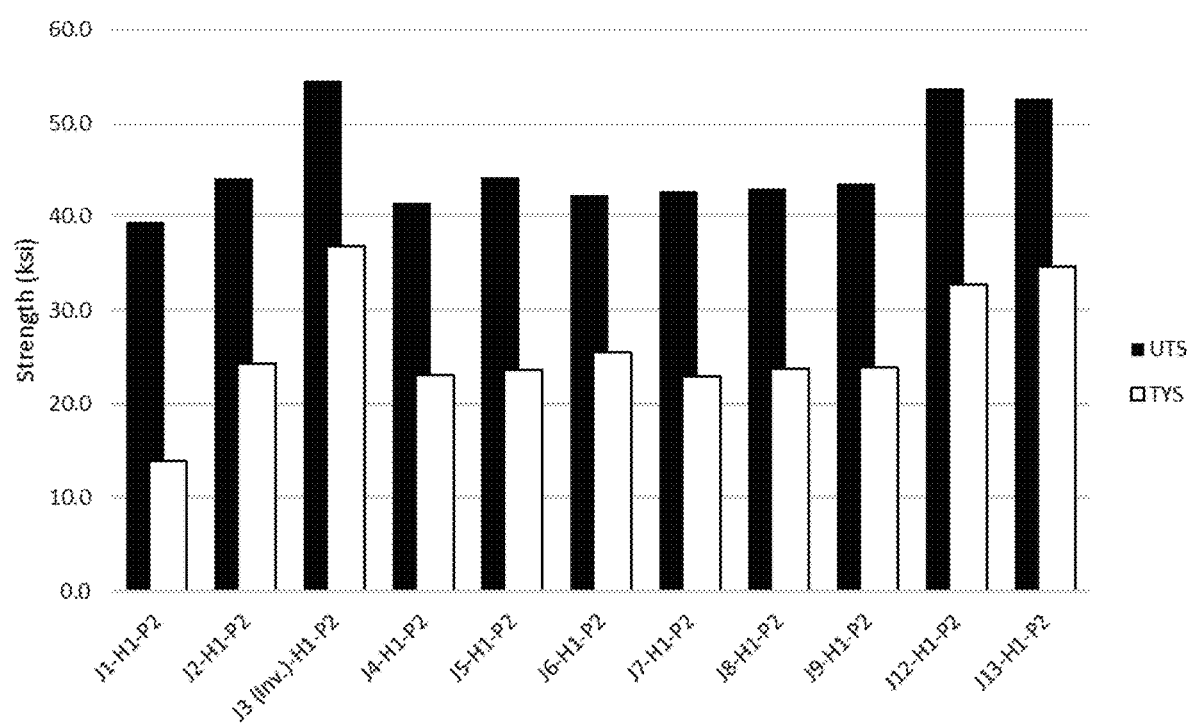
FIG. 4 is a graph of tensile strengths (UTS and TYS) for alloys tested in Example 1 after undergoing post-thermomechanical deformation process P2.
Figure 5:
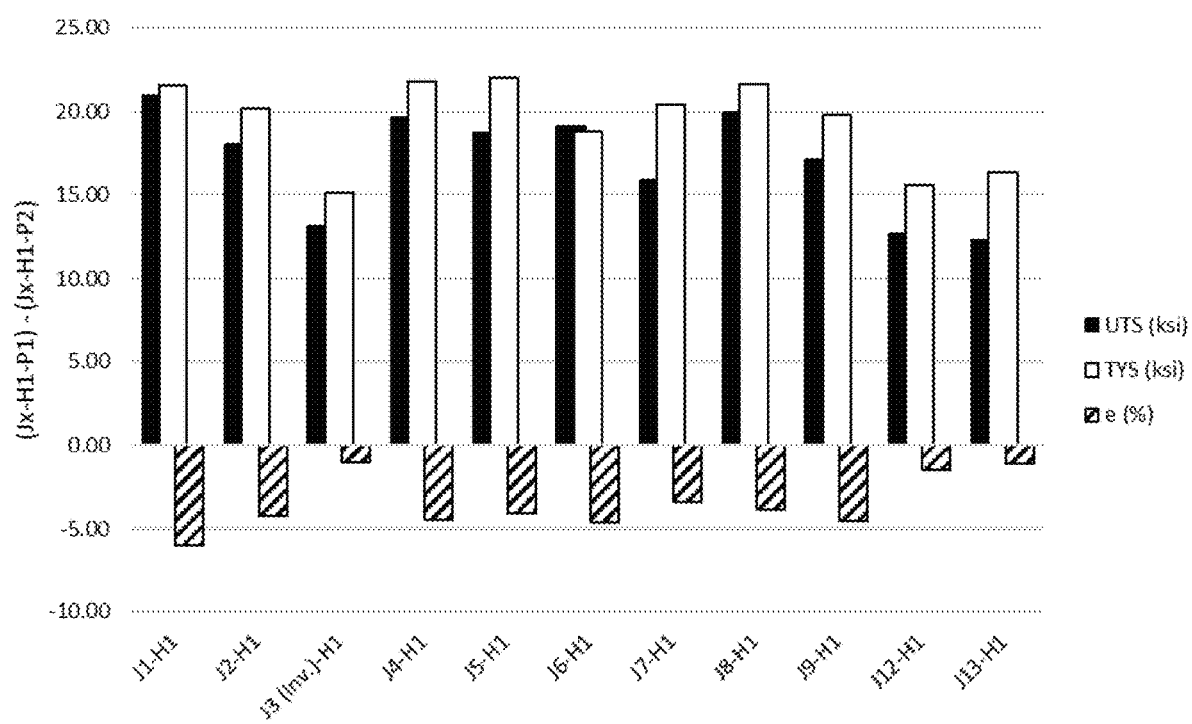
FIG. 5 is a graph of differences in tensile strength (UTS and TYS) and uniform elongation observed for alloys tested in Example 1 produced via post-thermomechanical deformation processes P1 and P2.

Two samples were taken from each extruded section to determine the static mechanical properties: ultimate tensile strength (UTS), tensile yield strength (TYS), and uniform elongation at fracture (e). The average values of these tensile tests can be seen in Table 6 and plotted in FIG. 3 and FIG. 4. The changed in properties between P1 and P2 can be seen in FIG. 5.

TABLE 6

Average mechanical properties obtained from the processing of Example 1

| | | Jx-H1-P1 | | | Jx-H1-P2 | | | (Jx-H1-P1) − (Jx-H1-P2) | | |
|---|---|---|---|---|---|---|---|---|---|---|
| Alloy | Orientation | UTS (ksi) | TYS (ksi) | e (%) | UTS (ksi) | TYS (ksi) | e (%) | UTS (ksi) | TYS (ksi) | e (%) |
| J1 | L | 60.3 | 35.4 | 7.2 | 39.4 | 13.9 | 13.2 | 20.9 | 21.5 | −6.0 |
| J2 | L | 62.1 | 44.6 | 7.3 | 44.1 | 24.4 | 11.5 | 18.0 | 20.2 | −4.2 |
| J3 (Inv.) | L | 67.7 | 51.8 | 7.1 | 54.5 | 36.8 | 8.2 | 13.2 | 15.0 | −1.1 |
| J4 | L | 61.0 | 45.0 | 6.9 | 41.3 | 23.1 | 11.4 | 19.7 | 21.9 | −4.5 |
| J5 | L | 63.0 | 45.7 | 6.9 | 44.2 | 23.6 | 10.9 | 18.8 | 22.1 | −4.0 |
| J6 | L | 61.5 | 44.4 | 7.2 | 42.3 | 25.5 | 11.8 | 19.2 | 18.9 | −4.6 |
| J7 | L | 58.7 | 43.4 | 6.7 | 42.8 | 23.0 | 10.1 | 15.9 | 20.4 | −3.4 |
| J8 | L | 62.9 | 45.4 | 7.1 | 43.0 | 23.7 | 10.9 | 19.9 | 21.7 | −3.8 |
| J9 | L | 60.6 | 43.7 | 7.1 | 43.6 | 23.9 | 11.7 | 17.0 | 19.8 | −4.6 |
| J12 | L | 66.4 | 48.4 | 7.1 | 53.7 | 32.8 | 8.6 | 12.7 | 15.6 | −1.5 |
| J13 | L | 64.9 | 50.9 | 7.3 | 52.6 | 34.6 | 8.4 | 12.3 | 16.3 | −1.1 |

Figure 6:
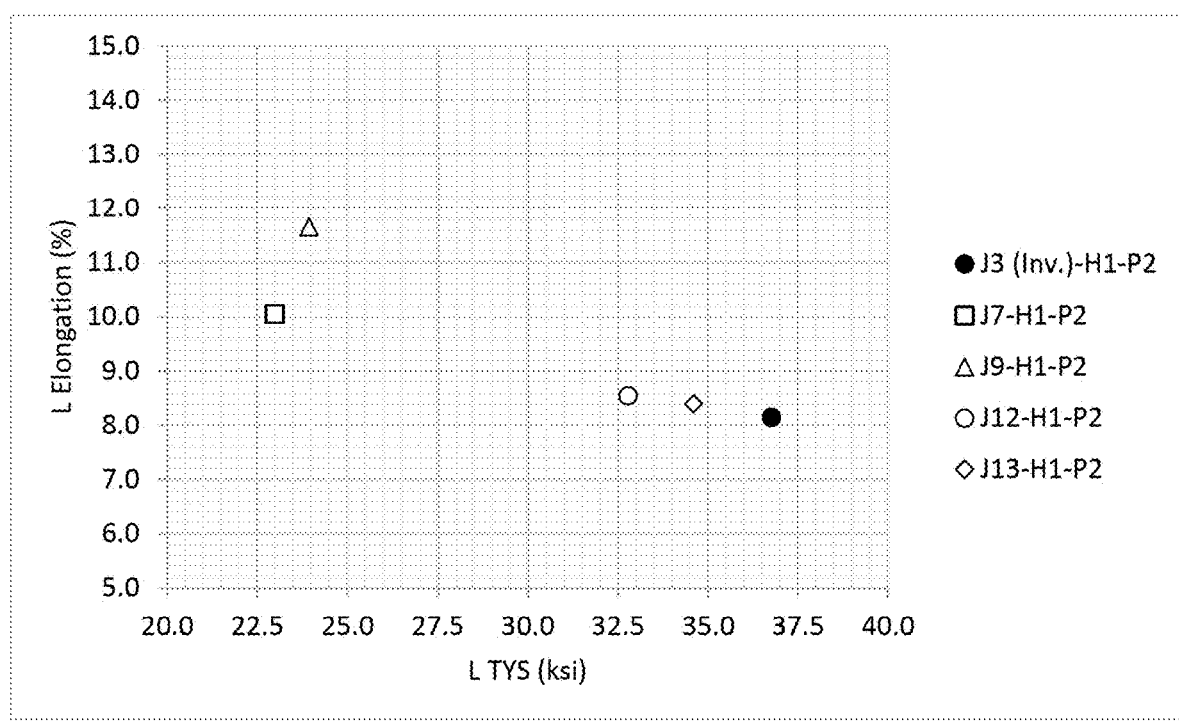
FIG. 6 is a graph of longitudinal tensile strength versus longitudinal uniform elongation for J3 (Inv.)-H1-P2, J7-H1-P2, J9-H1-P2, J12-H1-P2, and J13-H1-P2 as detailed in Example 1.

FIG. 6 displays the post-thermal exposure TYS versus the uniform elongation. It will be recognized J7 contains Ni, J9 contains Ag, and J12 and J13 contain V. The high temperature thermal exposure has a similar effect to annealing on mechanical properties, as known to one skilled in the art. When a wrought product is annealed, it loses strength and gains ductility. As evident in FIG. 6, J3, surprisingly, retains more strength than J7, J9, J12 or J13 when exposed at 536° F. for 24 hours, e.g., longitudinal ultimate tensile strength is greater than 53 ksi and longitudinal tensile yield strength is greater than 35.5 ksi after the thermal exposure.

As shown in FIG. 3 through FIG. 6, the alloy of this invention, which is in Example 1 is embodied by J3, obtains high strength levels at room temperature and after a high temperature thermal exposure, surprisingly, without the utilization of Ni, Ag, V, or combination thereof.

EXAMPLE 2

In this example, alloys from Example 1 were cast, homogenized, and hot extruded into 0.21-inch rod sections. Alloys J1, J2, and J3 were homogenized according to practice H1 before being hot extruded. After being hot extruded, the resulting F-temper sections were solution heat treated, quenched, stretched, and aged according to P1 and P2.

Figure 7:
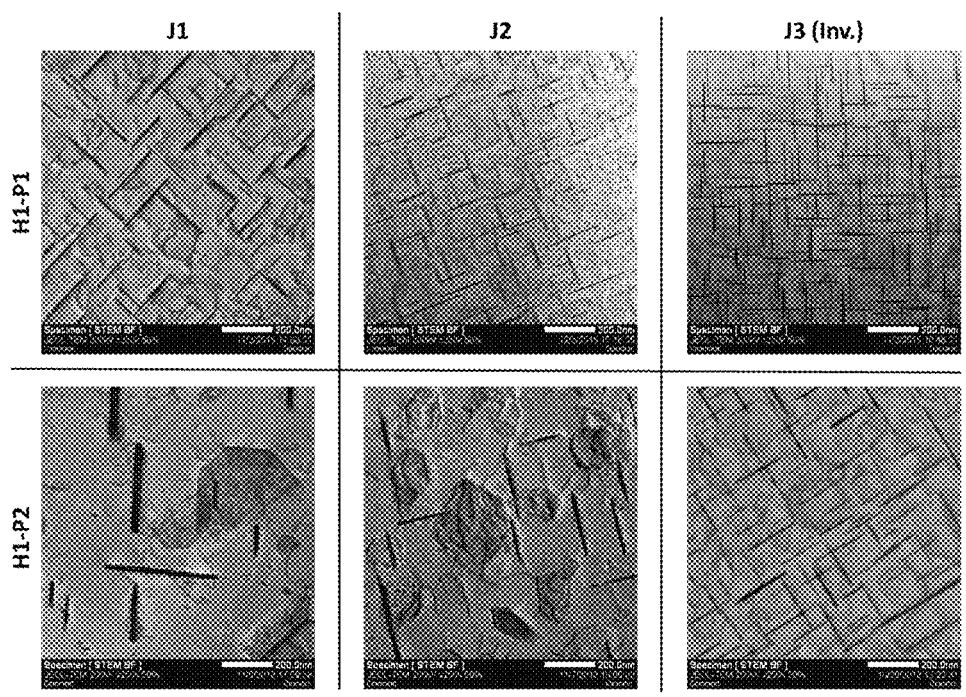
FIG. 7 includes TEM images of comparative alloys and an alloy of the invention after different processing conditions as detailed in Example 2.

Samples were then extracted from the resulting T-temper rods and analyzed via transmission electron microscopy (TEM). The results can be seen in FIG. 7. As can been in FIG. 7, the microstructure of J3 shows a refined distribution of precipitates compared to J1 and J2 under similar processing conditions. This is especially apparent after the thermal exposure of P2.

Figure 8:
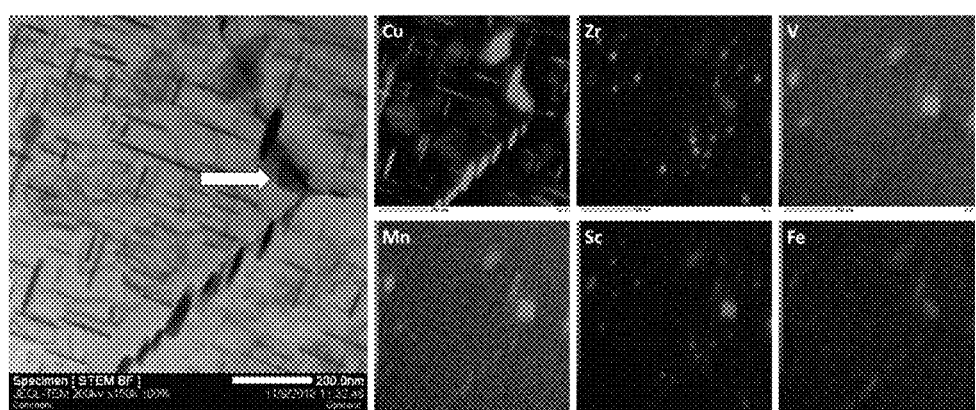
FIG. 8 includes a TEM image with EDX maps showing a primary intermetallic particle as detailed in Example 2.

A sample of J13-H1-P1, whose composition essentially amounts to a 2×19-type alloy with a meaningful Sc addition, was also analyzed via TEM. The results can be seen in FIG. 8. It will be observed that a small primary intermetallic was observed in the TEM as highlighted by the arrow in FIG. 8. Energy dispersive X-ray analysis (EDX), known to those skilled in the art, revealed the primary intermetallic to contain Cu, Zr, Sc, Mn, Fe and V. No such intermetallics were observed in alloy J3.

It will be recognized that quantitative microstructural characterization via TEM is difficult due to the high magnification and would require numerous observations as detailed in U.S. Pat. No. 8,366,839. However, the results presented herein are representative of common observations on the alloy of this invention.

EXAMPLE 3

In this example, alloys from Example 1 were homogenized according to practice H1 before being hot extruded into 0.21-inch rod sections. The resulting F-temper sections were then subjected to Post-Thermomechanical Deformation Process P3, which can be seen in Table 7. It should be noted that the extruded sections were solution heat treated at 995° F. for 1 hour.

TABLE 7

Post-Thermomechanical Deformation Processing Parameters

| Process ID | Solution Heat Treatment | Stretch (%) | Minimum Room Temperature Aging Time | Artificial Aging Practice | Thermal Exposure |
|---|---|---|---|---|---|
| P3 | 995° F. | 0.0 | 72 Hours | — | — |

Samples were then extracted from the resulting T-temper rods and analyzed via differential scanning calorimetry (DSC) using a scan rate of 10° C./min from 100° C. (212° F.) to 575° C. (1067° F.). The DSC results can be seen in FIG. 9, FIG. 10 and FIG. 11.

Figure 9:
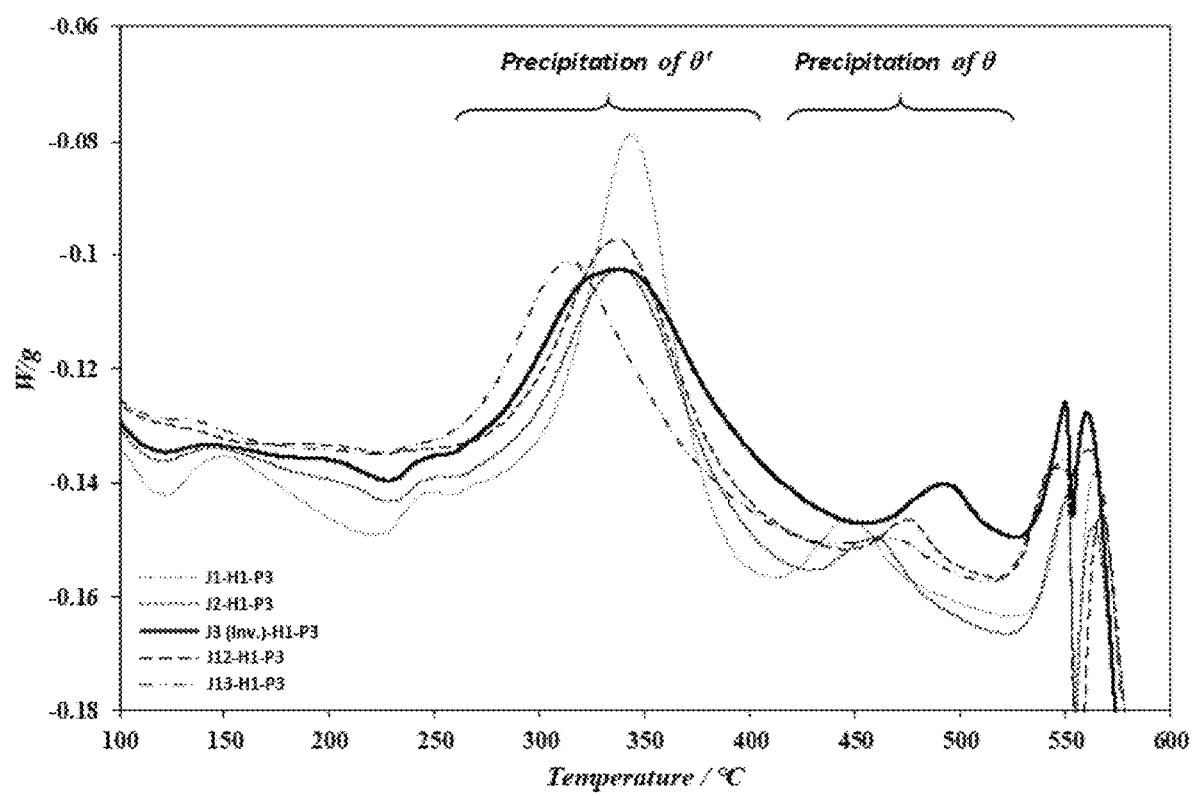
FIG. 9 includes DSC curves of various alloys of Example 3.
Figure 10:
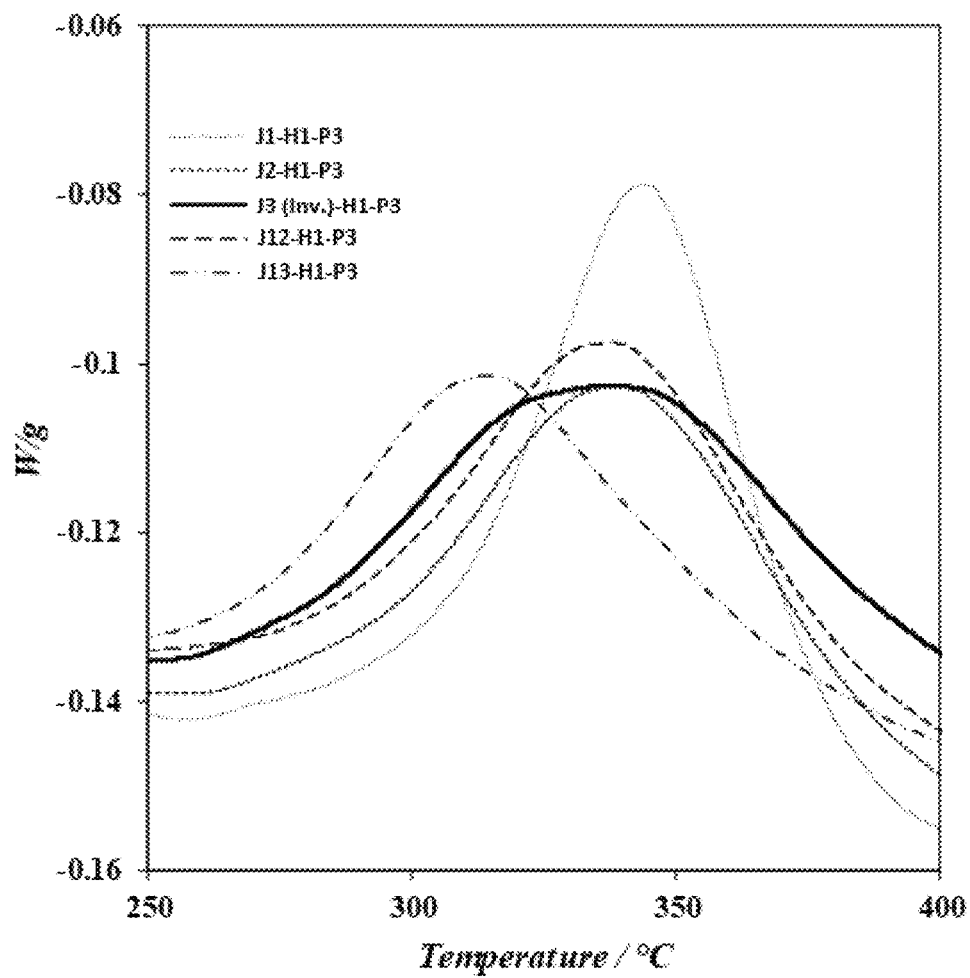
FIG. 10 includes DSC curves of various alloys of Example 3 focusing on the θ' precipitation peak.
Figure 11:
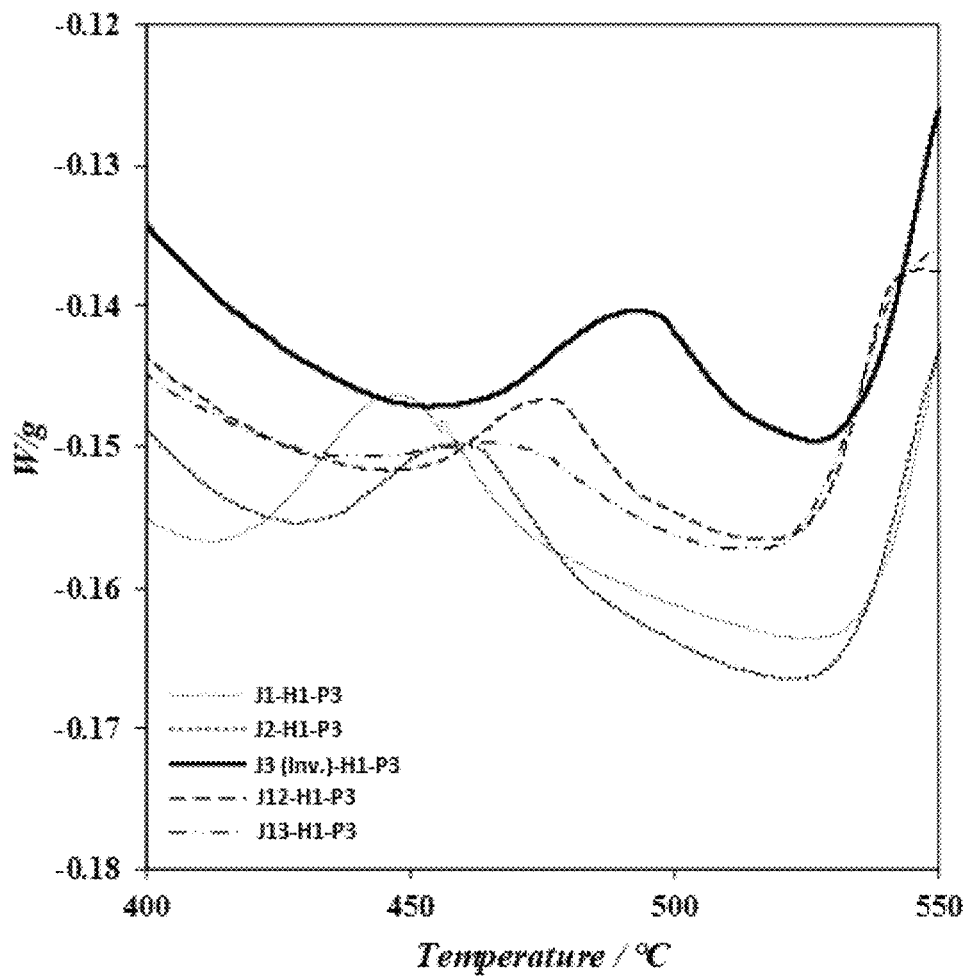
FIG. 11 includes DSC curves of various alloys of Example 3 focusing on the θ precipitation peak.

FIG. 9 illustrates the DSC results across the entire temperature range scanned with annotations describing the different precipitation peaks, as known to those skilled in the art. FIG. 10 highlights the θ' precipitation peaks for the alloys analyzed whereas FIG. 11 highlights the θ precipitation peak for the alloys analyzed. The relative shifting of precipitation peaks in DSC scans using the same scan rate with regards to temperature gives information about how readily a phase will precipitate or the stabilization of a precipitate pending on the direction of the shift as known to those skilled in the art. It is clear from FIG. 10 that the peak θ' precipitation temperature is roughly the same for J2, J3 and J12 with the θ' precipitation peaks for J1 and J13 appearing at higher and lower temperatures, respectively. However, it will be appreciated that in FIG. 11 the θ peak from J3 has clearly shifted to a higher temperature compared to the other alloys indicating a stabilization of the θ' precipitates in this alloy. While the inventors do not wish to be held to any theory of inventions, it is believed the stabilization of θ' observed in FIG. 11 for J3 gives the alloy its enhanced high temperature properties.

EXAMPLE 4

In this example, several billets of Al—Cu—Mn—Mg—Ag alloys wherein the compositions are given in Table 8 were cast.

TABLE 8

Results of compositional chemical analysis of billets in wt. %

| Alloy | Si | Fe | Cu | Mn | Mg | Cr | Ni | Zn | Ti | Zr | Sc | V | Ag | Density (lbs/in$^3$) |
|---|---|---|---|---|---|---|---|---|---|---|---|---|---|---|
| J10 | 0.05 | 0.12 | 6.22 | 0.31 | 0.31 | 0.00 | 0.01 | 0.01 | 0.02 | 0.12 | 0.06 | 0.01 | 0.20 | 0.102 |
| J11 | 0.05 | 0.12 | 6.53 | 0.33 | 0.28 | 0.00 | 0.01 | 0.00 | 0.02 | 0.00 | 0.00 | 0.01 | 0.21 | 0.103 |

Figure 12:
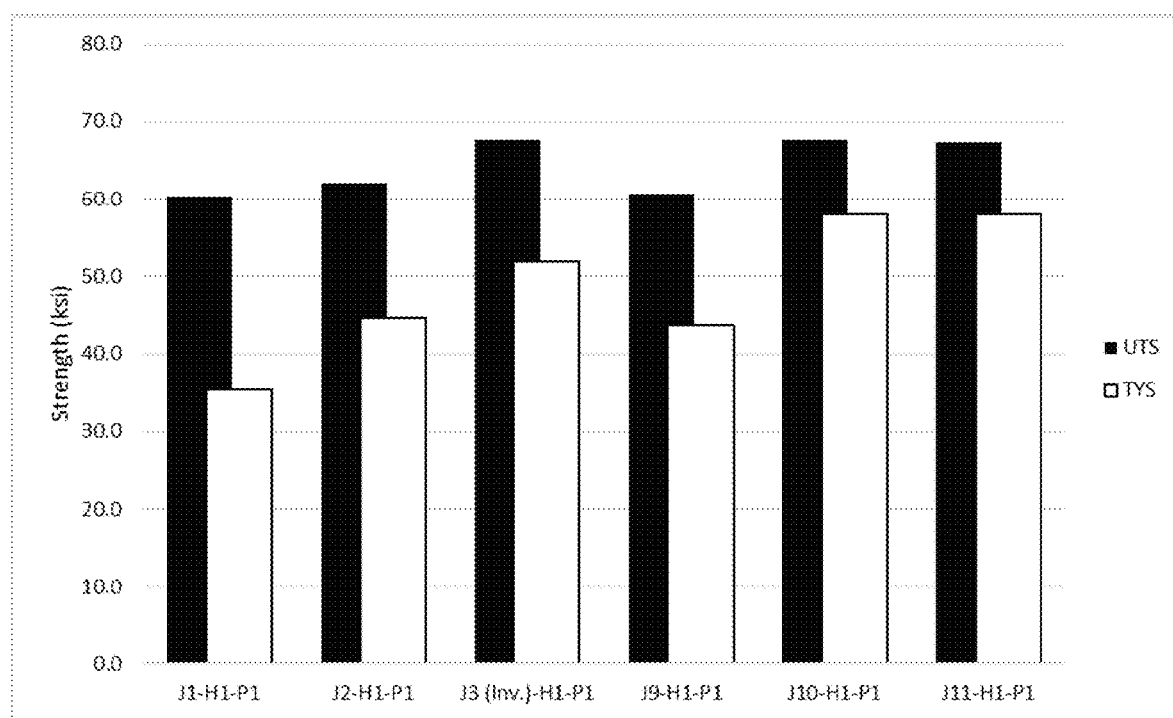
FIG. 12 is a graph of tensile strengths (UTS and TYS) for alloys tested in Example 4 after undergoing post-thermomechanical deformation process P1.
Figure 13:
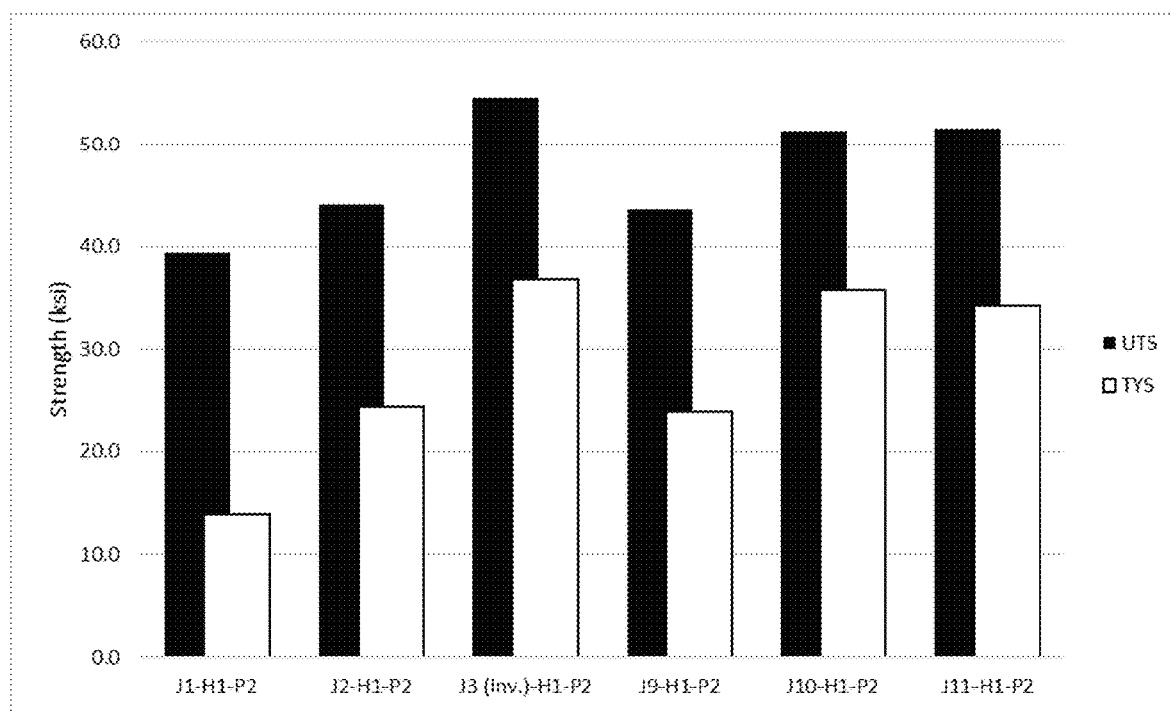
FIG. 13 is a graph of tensile strengths (UTS and TYS) for alloys tested in Example 4 after undergoing post-thermomechanical deformation process P2.
Figure 14:
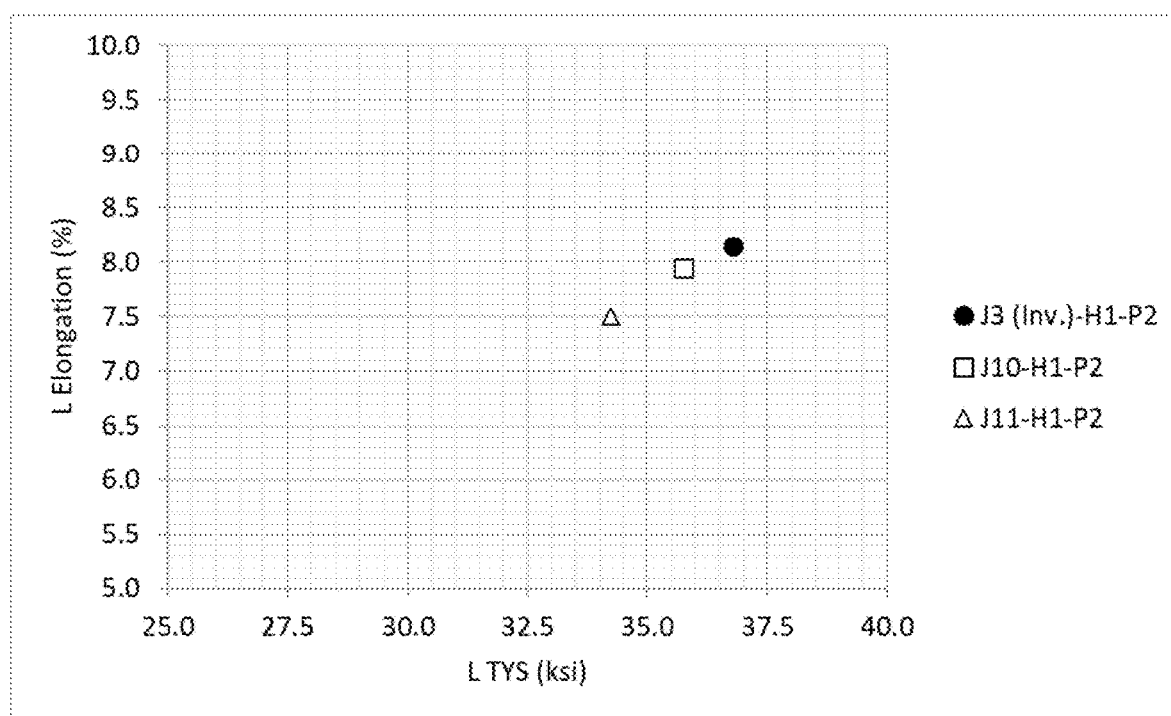
FIG. 14 is a graph of longitudinal tensile strength versus longitudinal uniform elongation for comparative alloys and an alloy of the invention as detailed in Example 4.

The billets were then homogenized according to practice H1 before being extruded into 0.21-inch rods before being processed per P1 and P2. Two samples were taken from each extruded section to determine the static mechanical properties. The averages of these tensile tests can be seen in Table 9 and are plotted in FIG. 12 and FIG. 13 against the results of J1, J2, J3 (inv), and J9 obtained in Example 1. FIG. 14 shows the post-thermal exposure (P2) TYS versus uniform elongation of J3 (inv), J10 and J11.

TABLE 9

Average mechanical properties obtained from the processing of Example 3

| | | Jx-H1-P1 | | | Jx-H1-P2 | | | Jx-H1-P1 − Jx-H1-P2 | | |
|---|---|---|---|---|---|---|---|---|---|---|
| Alloy | Orientation | UTS (ksi) | TYS (ksi) | e (%) | UTS (ksi) | TYS (ksi) | e (%) | UTS (ksi) | TYS (ksi) | e (%) |
| J1 | L | 60.3 | 35.4 | 7.2 | 39.4 | 13.9 | 13.2 | 20.9 | 21.5 | −6.0 |
| J2 | L | 62.1 | 44.6 | 7.3 | 44.1 | 24.4 | 11.5 | 18.0 | 20.2 | −4.2 |
| J3 (Inv) | L | 67.7 | 51.8 | 7.1 | 54.5 | 36.8 | 8.2 | 13.2 | 15.0 | −1.1 |
| J9 | L | 60.6 | 43.7 | 7.1 | 43.6 | 23.9 | 11.7 | 17.0 | 19.8 | −4.6 |
| J10 | L | 67.7 | 58.0 | 6.9 | 51.3 | 35.8 | 8.0 | 16.4 | 22.2 | −1.1 |
| J11 | L | 67.4 | 58.0 | 6.1 | 51.6 | 34.2 | 7.5 | 15.8 | 23.8 | −1.4 |

Figure 15:
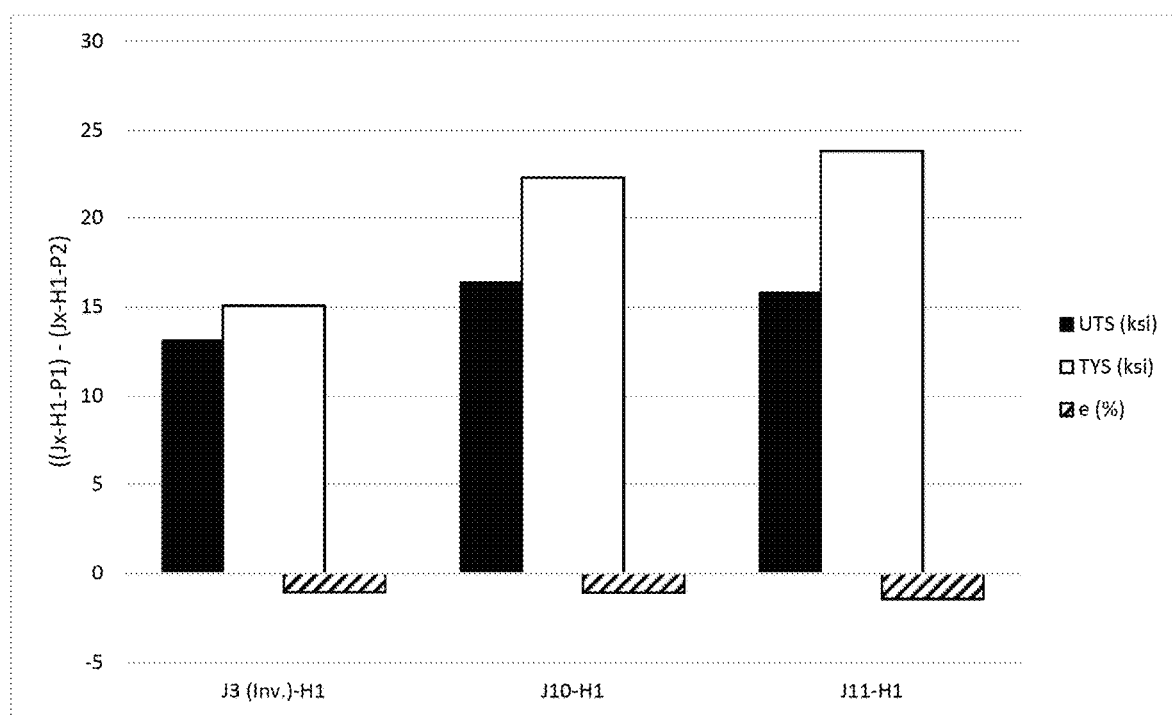
FIG. 15 is a graph of differences in tensile strength (UTS and TYS) and uniform elongation observed for alloys tested in Example 4 produced via post-thermomechanical deformation processes P1 and P2.

Although the Ag-bearing J10 and J11 displayed higher mechanical properties in the peak-aged condition resulting from P1 compared to J3, the Ag-free J3, surprisingly, exhibited better mechanical properties after the high temperature thermal exposure resulting from P2. This surprising effect can be seen in FIG. 15.

EXAMPLE 5

In this example, several Al—Cu alloys wherein the compositions can be seen in Table 10 were cast.

TABLE 10

Results of compositional chemical analysis of billets in wt. %

| Alloy | Cu | Zr | Sc |
|---|---|---|---|
| B1 | 4.0 | — | — |
| B2 | 4.0 | 0.13 | — |
| B3 | 4.0 | — | 0.18 |
| B4 | 4.0 | 0.19 | 0.10 |

Figure 16:
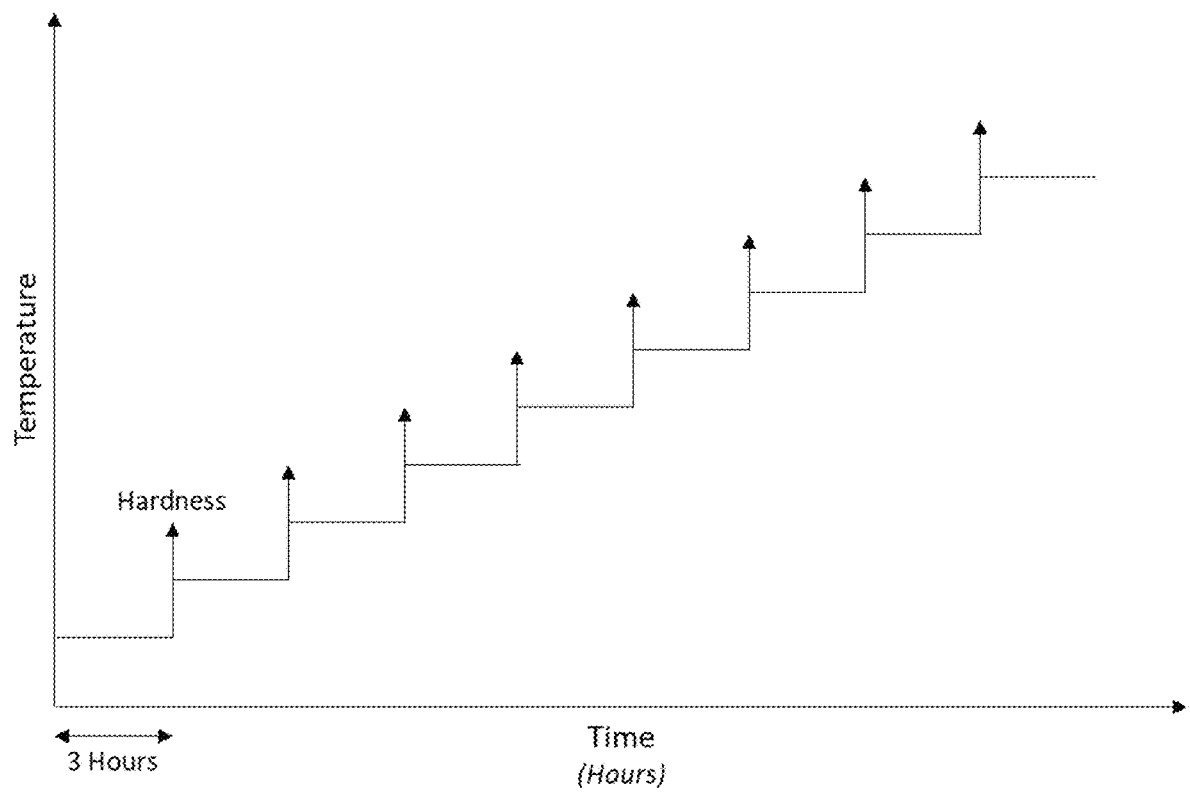
FIG. 16 is a schematic time vs. temperature graph illustrating an example isochronal heat treatment.

The resulting ingots were subjected to an isochronal heat treatment, known to those skilled in the art, using 3-hour time intervals as detailed in FIG. 16. After each 3-hour exposure, the samples were tested for Vickers hardness before being returned to the oven and heated at higher temperature. The results can be seen in FIG. 17.

Figure 17:
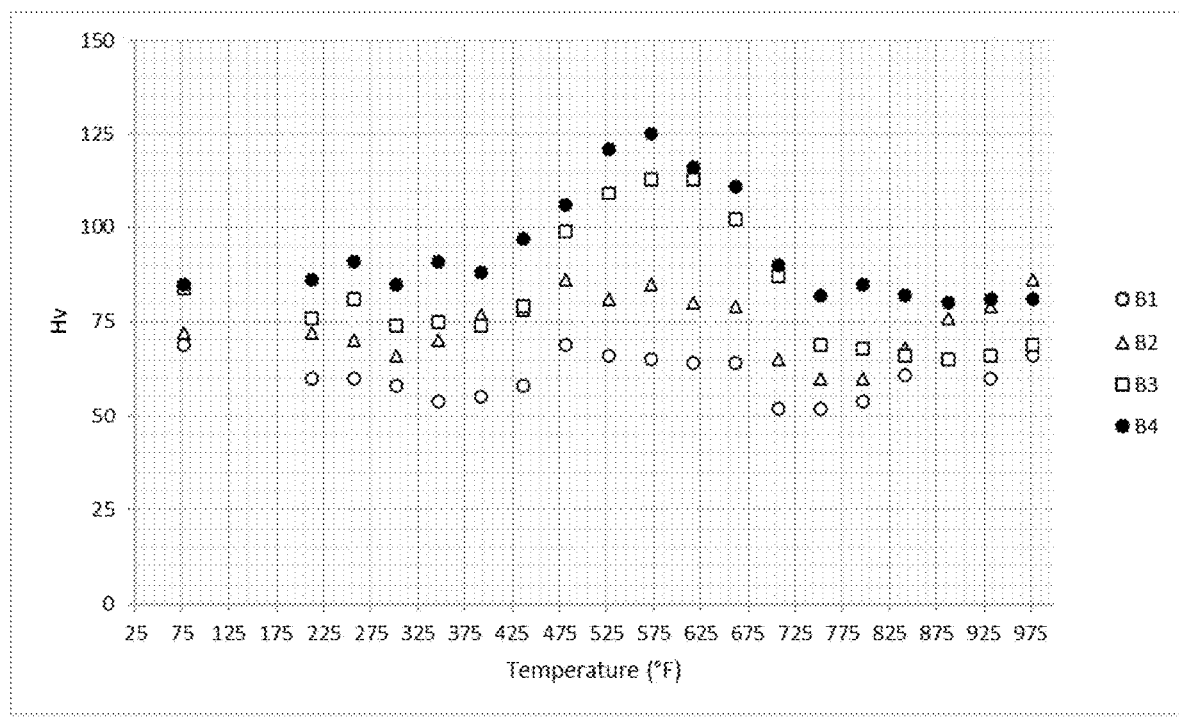
FIG. 17 is a graph of Vickers hardness (Hv) measurements for alloys tested in Example 5 throughout the isochronal heat treatment.

FIG. 17 indicates a major hardening event occurs in alloys B3 and B4 approximately between 425° F. and 620° F. Conversely, alloys B1 and B2, which are Sc-Free, only display a minor strength increase in the range.

Therefore, while the alloys in Table 10 are compositionally considered outside the scope of the current invention, they were included to teach the reasoning behind the multi-step homogenization treatment utilized herein.

EXAMPLE 6

In this example, an Al—Cu alloy representing the alloy of this invention and whose composition can be seen in Table 11 was cast into a 7-inch billet using DC casting techniques.

TABLE 11

Results of compositional chemical analysis of billets in wt. %

| Alloy | Si | Fe | Cu | Mn | Mg | Cr | Ni | Zn | Ti | Zr | Sc | V | Ag | Density (lbs/in$^3$) |
|---|---|---|---|---|---|---|---|---|---|---|---|---|---|---|
| X1 | 0.04 | 0.10 | 6.73 | 0.31 | 0.03 | — | — | 0.01 | 0.02 | 0.12 | 0.06 | — | — | 0.103 |

Figure 18:
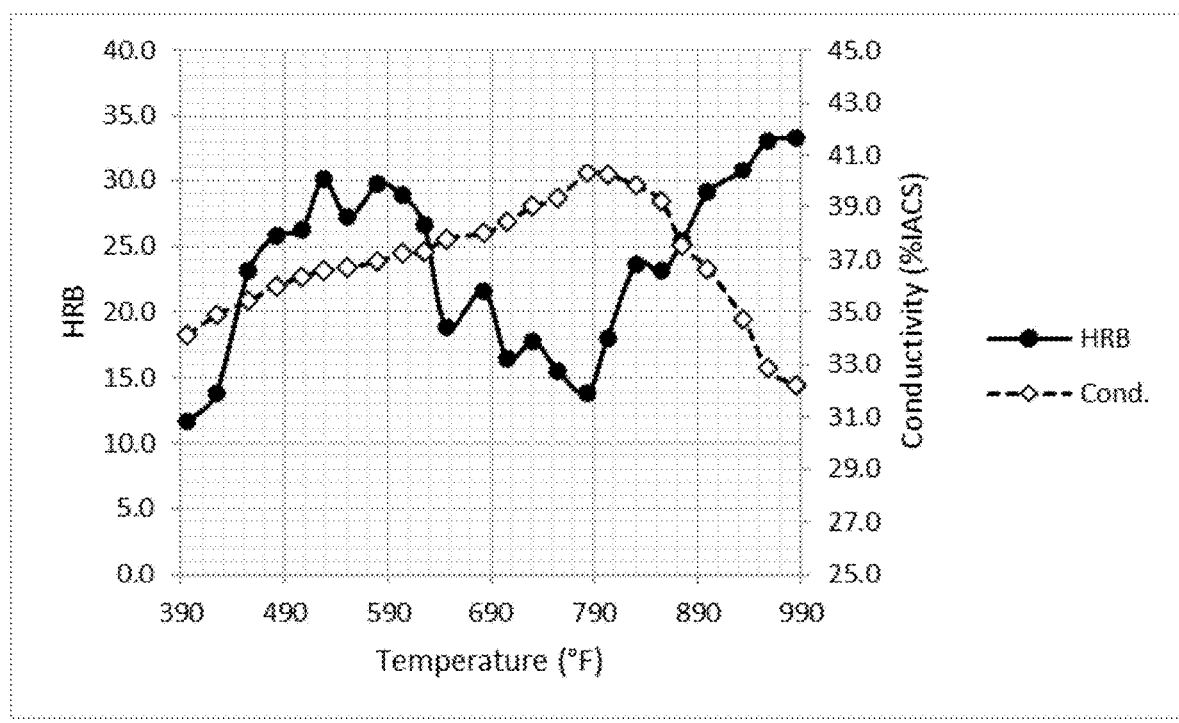
FIG. 18 is a graph of Rockwell hardness (FIRE) and electrical conductivity (% IACS) measurements for an alloy tested in Example 7 during an isochronal heat treatment.

The resulting DC billets were cropped before 0.5-inch slices were taken off the head and tail of the log. The billets slices were then subjected to an isochronal heat treatment from approximately 396° F. to 986° F. using three-hour time intervals. After each exposure, the samples were tested for Rockwell hardness (B-scale) and electrical conductivity at the billet slice quarter point. The head and tail results were then averaged together. The results can be seen in FIG. 18.

X1 displays two noticeable increases in hardness between approximately 390° F. and 610° F. and above 790° F. While the inventors do not wish to be held to any theory of invention, it can be observed that the electrical conductivity increased from 390° F. to 810° F. This would indicate that solute is coming out of solution during this temperature range. Therefore, the first observed increase in hardness is believed to be due to the precipitation of Sc. The second observed increase in hardness, at least initially, is thought to be due to the precipitation of Zr. However, the observation can eb made that the electrical conductivity begins to drop above roughly 830° F. indicating that solute is beginning to go back into solute. Therefore, one skilled in the art could reasonably assume solid solution hardening also plays a role in the later part of the second observed increase in hardness.

EXAMPLE 7

In this example, two alloys falling within the registered Aluminum Association limits of AA2219 were cast. The composition of these alloys can be seen in Table 12.

TABLE 12

Results of compositional chemical analysis of billets in wt. %

| Alloy | Si | Fe | Cu | Mn | Mg | Cr | Ni | Zn | Ti | Zr | Sc | V | Ag | Density (lbs/in$^3$) |
|---|---|---|---|---|---|---|---|---|---|---|---|---|---|---|
| V1 | 0.06 | 0.12 | 6.31 | 0.28 | 0.01 | — | — | 0.03 | 0.05 | 0.13 | — | 0.08 | — | 0.102 |
| V2 | 0.05 | 0.12 | 6.14 | 0.28 | 0.01 | — | — | 0.03 | 0.05 | 0.13 | — | 0.08 | — | 0.102 |

The as-cast billets of V1 and V2 along with the 7-inch billets of alloy X1 in Example 6 were then homogenized according to either practice H2 or H3 which are given in Table 13.

TABLE 13

Homogenization Practices

| ID | Step 1 | Step 2 | Step 3 |
|---|---|---|---|
| H2 | 482° F. - 24 Hours | 842° F. - 12 Hours | 985° F. - 21 Hours |
| H3 | 985° F. - 21 Hours | — | — |

After being homogenized, the billets were extruded using a direct extrusion press with a 7-inch container, known by those moderately skilled in the art, into various F-temper sections as can be seen in Table 14. The resulting F-temper sections were then processed via one of the Post-Thermomechanical Deformation Processes given in Table 15.

TABLE 14

Extruded Profiles used in Example 7

| Extruded Shape | Type | Thickness (in) | Aspect Ratio |
|---|---|---|---|
| A | Bar | 0.500 | 8.0 |
| B | Bar | 0.250 | 16.0 |

TABLE 14-continued

Extruded Profiles used in Example 7

| Extruded Shape | Type | Thickness (in) | Aspect Ratio |
|---|---|---|---|
| C | Profile | 1.750 | 1.0 |
| D | Profile | 0.130 | 12.5 |
| E | Profile | 0.100 | 25.0 |

TABLE 15

Post-Thermomechanical Deformation Processing Parameters

| Process ID | Solution Heat Treatment | Stretch (%) | Minimum Room Temperature Aging Time | Artificial Aging Practice | Notes |
|---|---|---|---|---|---|
| P4 | 995° F. | 2.5 | 72 Hours | 375° F. - 18 Hours | — |
| P5 | 995° F. | 2.5 | 72 Hours | 350° F. - 24 Hours | — |
| P6 | 995° F. | 1-3 | 72 Hours | 375° F. - 18 Hours | AA2219-T8511 |

Figure 19:
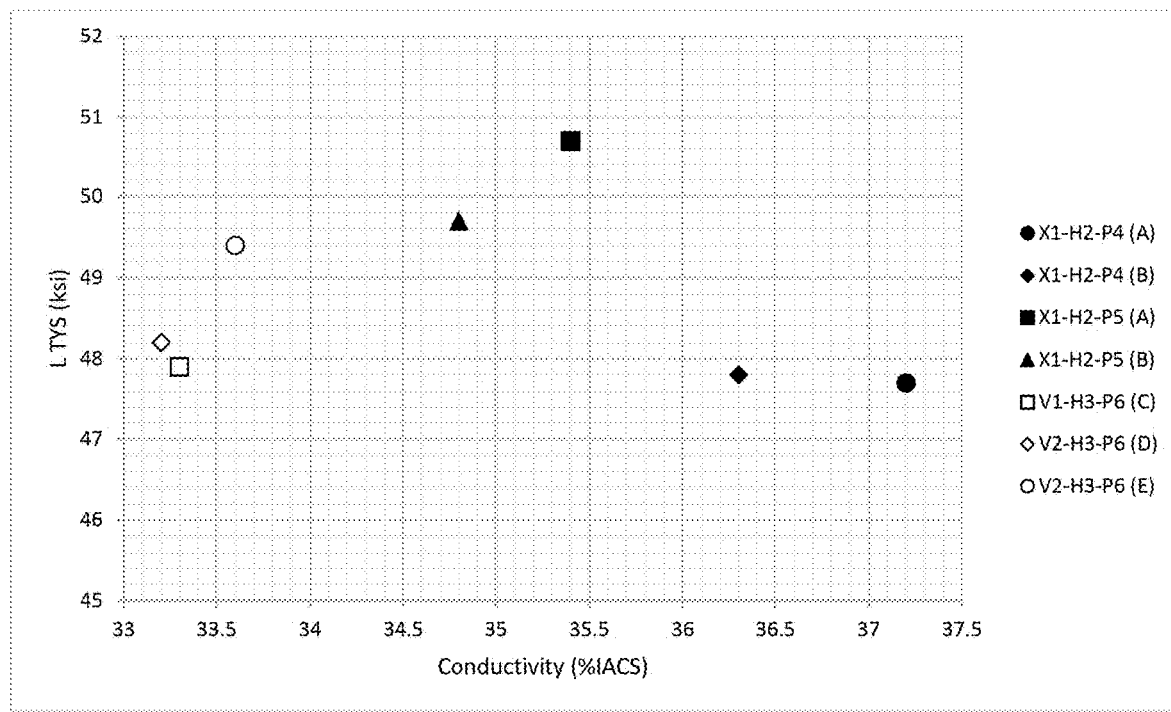
FIG. 19 is a graph of tensile yield strength (ksi) versus electrical conductivity (% IACS) for the various alloys of Example 7.
Figure 20:
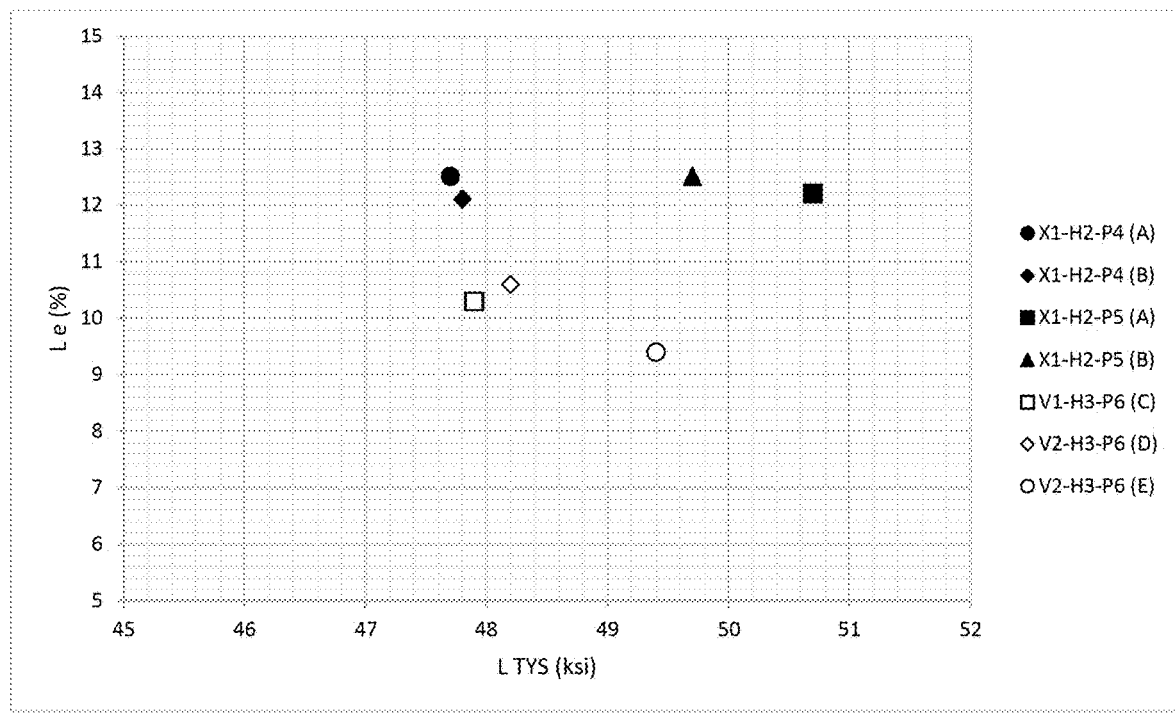
FIG. 20 is a graph of uniform elongation at fracture (%) versus tensile yield strength (ksi) for the various alloys of Example 7.

The extrusions were then tested for tensile strength in the longitudinal (L) direction and electrical conductivity. The results are given in Table 16 and can be seen in FIG. 19 and FIG. 20.

TABLE 16

Results of Mechanical and Conductivity Testing

| ID | Extruded Shape | UTS (ksi) | TYS (ksi) | e (%) | Conductivity (% IACS) |
|---|---|---|---|---|---|
| X1-H2-P4 | A | 62.8 | 47.7 | 12.5 | 37.2 |
| X1-H2-P5 | A | 64.6 | 50.7 | 12.2 | 35.4 |
| X1-H2-P4 | B | 62.9 | 47.8 | 12.1 | 36.3 |
| X1-H2-P5 | B | 62.2 | 49.7 | 12.5 | 34.8 |
| V1-H3-P6 | C | 63.7 | 47.9 | 10.3 | 33.3 |
| V2-H3-P6 | D | 65.2 | 48.2 | 10.6 | 33.2 |
| V2-H3-P6 | E | 64.7 | 49.4 | 9.4 | 33.6 |

EXAMPLE 8

In this example, thirty-two (32) commercially produced and sold lots of AA2219-T8511 as defined by AMS 4162, included herein as reference, were inspected for electrical conductivity. Maximum and minimum values on each lot were taken and recorded. Herein a lot is defined as a batch of material made from the same cast that was extruded, heat treated, and aged together. The compositional range of these lots can be seen in Table 17 along with the range of part thickness and aspect ratios.

TABLE 17

Summary of Tested Commercially Bought and Sold AA2219-T8511. Composition ranges are given in wt. % and thickness is given in inches.

|     | Si   | Fe   | Cu   | Mn   | Mg   | Zn   | Ti   | V    | Zr   | Thickness | Aspect Ratio |
|-----|------|------|------|------|------|------|------|------|------|-----------|--------------|
| Min | 0.04 | 0.10 | 6.14 | 0.26 | —    | —    | 0.05 | 0.08 | 0.13 | 0.063     | 1.0          |
| Max | 0.06 | 0.13 | 6.52 | 0.32 | 0.01 | 0.04 | 0.07 | 0.10 | 0.16 | 4.000     | 31.3         |

Figure 21:
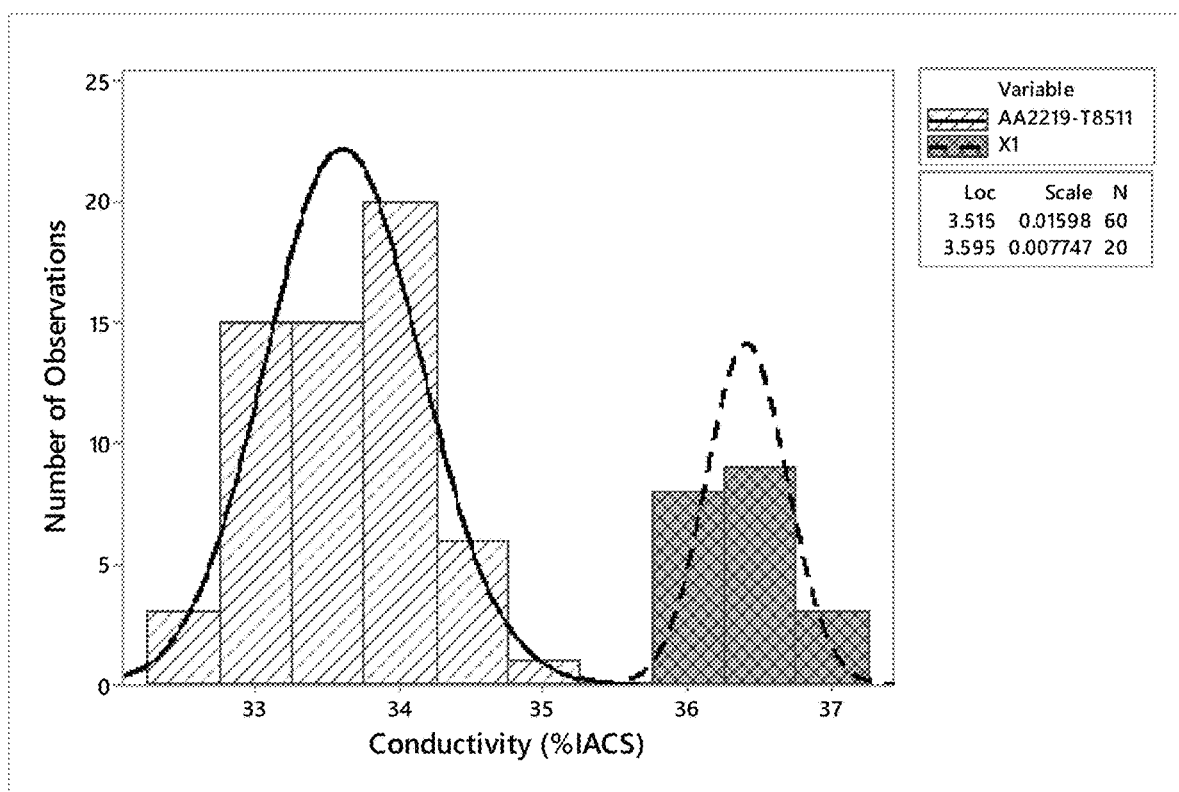
FIG. 21 are histograms comparing lot conductivity (% IACS) inspection of AA2219-T8511 vs alloy X1 of Example 8.

The conductivity inspection results can be seen in FIG. 21 compared to similar inspection data on alloy X1 detailed herein. It will be appreciated that even with a higher solute content, especially Cu, that X1 maintains a higher electrical conductivity than AA2219 under similar processing conditions.

For purposes of this detailed description, it is to be understood that the invention may assume alternative variations and step sequences, except where expressly specified to the contrary. Moreover, other than in any operating examples, or where otherwise indicated, all numbers expressing, for example, quantities of ingredients used in the specification and claims are to be understood as being modified in all instances by term "about". Accordingly, unless indicated to the contrary, the numerical parameters set forth in the foregoing specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application and the appended claims, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention as defined in the appended claims.

What is claimed is:

1. A method of producing a wrought aluminum alloy product comprising from 4.5 to 6.75 weight percent Cu, from 0.1 to 0.6 weight percent Mn, from 0.05 to 0.25 weight percent Zr, from 0.02 to 0.20 weight percent Sc, wherein the Sc content is less than or equal to the Zr content, from 0.01 to 0.15 weight percent Ti, up to 0.30 weight percent Fe, up to 0.25 weight percent Mg, up to 0.20 weight percent Si, less than 0.05 weight percent Ag, less than 0.05 weight percent V, less than 0.05 weight percent Ni, less than 0.05 weight percent Li, and the balance aluminum and incidental impurities, the method comprising:
   a. casting an unwrought billet, ingot or shape from a liquid metal bath;
   b. homogenizing the unwrought billet, ingot or shape at an equivalent time at temperature determined by an equation:

$$\frac{t_1}{t_2} = \exp\left[\frac{Q}{R}\left(\frac{1}{T_1} - \frac{1}{T_2}\right)\right]$$

where $t_1$ and $t_2$ are times in hours, $T_1$ and $T_2$ are temperatures converted to degrees Kelvin, Q is the activation energy using a Q=125.6 kJ/mol and R is the universal gas constant using R=8.314462 $JK^{-1}$ $mol^{-1}$, the homogenizing including:
   i. first stage heating within a temperature range of from 400° F. to 620° F. such that a first equivalent time at 995° F. is between 0.0001 and 0.036 hours;
   ii. second stage heating within a temperature of from 790° F. to 870° F. such that a second equivalent time at 995° F. is between 0.4 and 6.0 hours; and
   iii. third stage heating at a temperature greater than 950° F. such that a third equivalent time at 995° F. for the total first, second and third stages of the homogenization is between 5.75 and 65 hours;
   c. hot working the homogenized billet, ingot or shape into an extruded product;
   d. solution heat treating the wrought body at a temperature greater than or equal to 950° F. and subsequently quenching the wrought product;
   e. stretching the product to a permanent set of from 0.5 to 5 percent; and
   f. artificially aging the product at a temperature of from 200° F. to 425° F., wherein the extruded aluminum alloy product has a longitudinal tensile yield strength of at least 47 ksi and an electrical conductivity greater than 34.5% IACS.

2. The method of producing the wrought aluminum alloy product of claim 1, wherein the first stage heating is performed at a temperature of from 425° F. to 550° F. for 12 to 36 hours, the second stage heating is performed at a temperature of from 820° F. to 870° F. for 10 to 20 hours, and the third stage heating is performed at a temperature of from 985° F. to 1005° F. for 5 to 24 hours.

3. The method of producing the wrought aluminum alloy product of claim 1, wherein the Cu comprises from 4.75 to 6.7 weight percent, the Mn comprises from 0.2 to 0.5 weight percent, the Zr comprises from 0.06 to 0.2 weight percent, the Sc comprises from 0.03 to 0.15 weight percent, the Ti comprises from 0.01 to 0.1 weight percent, the Fe comprises no greater than 0.25 weight percent, the Mg comprises no greater than 0.15 weight percent, the Si comprises no greater than 0.18 weight percent, the Ag comprises no greater than 0.03 weight percent, the Ni comprises no greater than 0.03 weight percent, and the V comprises no greater than 0.03 weight percent.

4. The method of producing the wrought aluminum alloy product of claim 3, wherein the first stage heating is performed at a temperature of from 425° F. to 550° F. for 12 to 36 hours, the second stage heating is performed at a temperature of from 820° F. to 870° F. for 10 to 20 hours, and the third stage heating is performed at a temperature of from 985° F. to 1005° F. for 5 to 24 hours.

5. The method of producing the wrought aluminum alloy product of claim 1, wherein the Cu comprises from 4.9 to 6.7 weight percent, the Mn comprises from 0.2 to 0.5 weight percent, the Zr comprises from 0.06 to 0.18 weight percent, the Sc comprises from 0.03 to 0.12 weight percent, the Ti comprises from 0.01 to 0.08 weight percent, the Fe comprises no greater than 0.22 weight percent, the Mg comprises no greater than 0.10 weight percent, the Si comprises no greater than 0.15 weight percent, the Ag comprises no greater than 0.01 weight percent, the Ni comprises no greater than 0.01 weight percent, and the V comprises no greater than 0.01 weight percent.

6. The method of producing the wrought aluminum alloy product of claim 5, wherein the first stage heating is performed at a temperature of from 425° F. to 550° F. for 12 to 36 hours, the second stage heating is performed at a temperature of from 820° F. to 870° F. for 10 to 20 hours, and the third stage heating is performed at a temperature of from 985° F. to 1005° F. for 5 to 24 hours.

7. The method of producing the wrought aluminum alloy product of claim 1, wherein the Cu comprises from 5 to 6.6 weight percent, the Mn comprises from 0.2 to 0.5 weight percent, the Zr comprises from 0.08 to 0.15 weight percent, the Sc comprises from 0.04 to 0.08 weight percent, the Ti comprises from 0.01 to 0.05 weight percent, the Fe comprises no greater than 0.15 weight percent, the Mg comprises no greater than 0.05 weight percent, and the Si comprises no greater than 0.1 weight percent, such that the product is substantially free of Ag, Ni, V and Li.

8. The method of producing the wrought aluminum alloy product of claim 7, wherein the first stage heating is performed at a temperature of from 425° F. to 550° F. for 12 to 36 hours, the second stage heating is performed at a temperature of from 820° F. to 870° F. for 10 to 20 hours, and the third stage heating is performed at a temperature of from 985° F. to 1005° F. for 5 to 24 hours.

9. The method of producing the wrought aluminum alloy product of claim 1, further comprising cold working the homogenized billet, ingot or shape in addition to the hot working step.

10. The method of producing the wrought aluminum alloy product of claim 1, wherein the longitudinal tensile strength is at least 48 ksi, and the electrical conductivity is greater than 35% IACS.

11. The method of producing the wrought aluminum alloy product of claim 1, wherein the extruded aluminum alloy product has a longitudinal elongation failure greater than 11 percent.

12. A wrought aluminum alloy product produced by the method of claim 1.

13. A method for producing a wrought aluminum alloy product comprising from 4.5 to 6.75 weight percent Cu, from 0.1 to 0.6 weight percent Mn, from 0.05 to 0.25 weight percent Zr, from 0.02 to 0.20 weight percent Sc, wherein the Sc content is less than or equal to the Zr content, from 0.01 to 0.15 weight percent Ti, up to 0.30 weight percent Fe, up to 0.25 weight percent Mg, up to 0.20 weight percent Si, less than 0,05 weight percent Ag, less than 0.05 weight percent V, less than 0.05 weight percent Ni, less than 0.05 weight percent Li, and the balance aluminum and incidental impurities, the method comprising a. casting an unwrought billet, ingot or shape from a liquid metal bath;

b. homogenizing the unwrought billet, ingot or shape at an equivalent time at temperature determined by an equation:

$$\frac{t_1}{t_2} = \exp\left[\frac{Q}{R}\left(\frac{1}{T_1} - \frac{1}{T_2}\right)\right]$$

where $t_1$ and $t_2$ are times in hours, $T_1$ and $T_2$ are temperatures converted to degrees Kelvin, Q is the activation energy using a Q=125.6 kJ/mol and R is the universal gas constant using R=8.314462 JK$^{-1}$ mol$^{-1}$, the homogenizing including:

i. first stage heating within a temperature range of from 400° F. to 620° F. such that a first equivalent time at 995° F. is between 0.0001 and 0.036 hours;

ii. second stage heating within a temperature range of from 790° F. to 870° F. such that a second equivalent time at 995° F. is between 0.4 and 6.0 hours; and iii. third stage heating at a temperature greater than 950° F. such that a third equivalent time at 995° F. for the total first, second and third stages of the homogenization is between 5.75 and 65 hours;

c. hot working the homogenized billet, ingot or shape into an extruded product;

d. solution heat treating the wrought body at a temperature greater than or equal to 950° F. and subsequently quenching the wrought product;

e. stretching the product to a permanent set of from 0.5 to 5 percent; and f. artificially aging the product at a temperature of from 200° F. to 425° F., wherein the extruded aluminum alloy product has a longitudinal ultimate tensile strength greater than 65 ksi, a longitudinal tensile yield strength greater than 50 ksi, and a longitudinal elongation at failure greater than 7%.

14. The method of producing the wrought aluminum alloy product of claim 13, wherein the first stage heating is performed at a temperature of from 425° F. to 550° F. for 12 to 36 hours, the second stage heating is performed at a temperature of from 820° F. to 870° F. for 10 to 20 hours, and the third stage heating is performed at a temperature of from 985° F. to 1005° F. for 5 to 24 hours.

15. The method of producing the wrought aluminum alloy product of claim 14, wherein the Cu comprises from 4.75 to 6.7 weight percent, the Mn comprises from 0.2 to 0.5 weight percent, the Zr comprises from 0.06 to 0.2 weight percent, the Sc comprises from 0.03 to 0.15 weight percent, the Ti comprises from 0.01 to 0.1 weight percent, the Fe comprises no greater than 0.25 weight percent, the Mg comprises no greater than 0.15 weight percent, the Si comprises no greater than 0.18 weight percent, the Ag comprises no greater than 0.03 weight percent, the Ni comprises no greater than 0.03 weight percent, and the V comprises no greater than 0.03 weight percent.

16. The method of producing the wrought aluminum alloy product of claim 15, wherein the first stage heating is performed at a temperature of from 425° F. to 550° F. for 12 to 36 hours, the second stage heating is performed at a temperature of from 820° F. to 870° F. for 10 to 20 hours, and the third stage heating is performed at a temperature of from 985° F. to 1005° F. for 5 to 24 hours.

17. The method of producing the wrought aluminum alloy product of claim 13, wherein the Cu comprises from 4.9 to 6.7 weight percent, the Mn comprises from 0.2 to 0.5 weight percent, the Zr comprises from 0.06 to 0.18 weight percent, the Sc comprises from 0.03 to 0.12 weight percent, the Ti comprises from 0.01 to 0.08 weight percent, the Fe comprises no greater than 0.22 weight percent, the Mg comprises no greater than 0.10 weight percent, the Si comprises no greater than 0.15 weight percent, the Ag comprises no greater than 0.01 weight percent, the Ni comprises no greater than 0.01 weight percent, and the V comprises no greater than 0.01 weight percent.

18. The method of producing the wrought aluminum alloy product of claim 17, wherein the first stage heating is performed at a temperature of from 425° F. to 550° F. for 12 to 36 hours, the second stage heating is performed at a temperature of from 820° F. to 870° F. for 10 to 20 hours, and the third stage heating is performed at a temperature of from 985° F. to 1005° F. for 5 to 24 hours.

19. The method of producing the wrought aluminum alloy product of claim 13, wherein the Cu comprises from 5 to 6.6 weight percent, the Mn comprises from 0.2 to 0.5 weight percent, the Zr comprises from 0.08 to 0.15 weight percent, the Sc comprises from 0.04 to 0.08 weight percent, the Ti comprises from 0.01 to 0.05 weight percent, the Fe comprises no greater than 0.15 weight percent, the Mg comprises no greater than 0.05 weight percent, and the Si comprises no greater than 0.1 weight percent, such that the product is substantially free of Ag, Ni, V and Li.

20. The method of producing the wrought aluminum alloy product of claim 19, wherein the first stage heating is performed at a temperature of from 425° F. to 550° F. for 12 to 36 hours, the second stage heating is performed at a temperature of from 820° F. to 870° F. for 10 to 20 hours, and the third stage heating is performed at a temperature of from 985° F. to 1005° F. for 5 to 24 hours.

21. The method of producing the wrought aluminum alloy product of claim 13, further comprising cold working the homogenized billet, ingot or shape in addition to the hot working step.

22. A wrought aluminum alloy product produced by the method of claim 13.

23. A wrought aluminum alloy product comprising from 4.5 to 6.75 weight percent Cu, from 0.1 to 0.6 weight percent Mn, from 0.05 to 0.25 weight percent Zr, from 0.02 to 0.20 weight percent Sc, wherein the Sc content is less than or equal to the Zr content, from 0.01 to 0.15 weight percent Ti, up to 0.30 weight percent Fe, up to 0.25 weight percent Mg, up to 0.20 weight percent Si, less than 0.05 weight percent Ag, less than 0.05 weight percent V, less than 0.05 weight percent Ni, less than 0.05 weight percent Li, and the balance aluminum and incidental impurities, wherein the extruded aluminum alloy product has a longitudinal tensile yield strength of at least 47 ksi and an electrical conductivity greater than 34.5% IACS.

24. The wrought aluminum alloy product of claim 23, wherein the Cu comprises from 4.75 to 6.7 weight percent, the Mn comprises from 0.2 to 0.5 weight percent, the Zr comprises from 0.06 to 0.2 weight percent, the Sc comprises from 0.03 to 0.15 weight percent, the Ti comprises from 0.01 to 0.1 weight percent, the Fe comprises no greater than 0.25 weight percent, the Mg comprises no greater than 0.15 weight percent, the Si comprises no greater than 0.18 weight percent, the Ag comprises no greater than 0.03 weight percent, the Ni comprises no greater than 0.03 weight percent, and the V comprises no greater than 0.03 weight percent.

25. The wrought aluminum alloy product of claim 23, wherein the Cu comprises from 4.9 to 6.7 weight percent, the Mn comprises from 0.2 to 0.5 weight percent, the Zr comprises from 0.06 to 0.18 weight percent, the Sc comprises from 0.03 to 0.12 weight percent, the Ti comprises from 0.01 to 0.08 weight percent, the Fe comprises no greater than 0.22 weight percent, the Mg comprises no greater than 0.10 weight percent, the Si comprises no greater than 0.15 weight percent, the Ag comprises no greater than 0.01 weight percent, the Ni comprises no greater than 0.01 weight percent, and the V comprises no greater than 0.01 weight percent.

26. The wrought aluminum alloy product of claim 23, wherein the Cu comprises from 5 to 6.6 weight percent, the Mn comprises from 0.2 to 0.5 weight percent, the Zr comprises from 0.08 to 0.15 weight percent, the Sc comprises from 0.04 to 0.08 weight percent, the Ti comprises from 0.01 to 0.05 weight percent, the Fe comprises no greater than 0.15 weight percent, the Mg comprises no greater than 0.05 weight percent, the Si comprises no greater than 0.1 weight percent, and the balance aluminum and incidental impurities such that the product is substantially free of Ag, Ni, V and Li.

27. A wrought aluminum alloy product comprising from 4.5 to 6.75 weight percent Cu, from 0.1 to 0.6 weight percent Mn, from 0.05 to 0.25 weight percent Zr, from 0.02 to 0.20 weight percent Sc, wherein the Sc content is less than or equal to the Zr content, from 0.01 to 0.15 weight percent Ti, up to 0.30 weight percent Fe, up to 0.25 weight percent Mg, up to 0.20 weight percent Si, less than 0.05 weight percent Ag, less than 0.05 weight percent V, less than 0.05 weight percent Ni, less than 0.05 weight percent Li, and the balance aluminum and incidental impurities, wherein the extruded aluminum alloy product has a longitudinal ultimate tensile strength greater than 65 ksi, a longitudinal tensile yield strength greater than 50 ksi, and a longitudinal elongation at failure greater than 7%.

28. The wrought aluminum alloy product of claim 27, wherein the Cu comprises from 4.75 to 6.7 weight percent, the Mn comprises from 0.2 to 0.5 weight percent, the Zr comprises from 0.06 to 0.2 weight percent, the Sc comprises from 0.03 to 0.15 weight percent, the Ti comprises from 0.01 to 0.1 weight percent, the Fe comprises no greater than 0.25 weight percent, the Mg comprises no greater than 0.15 weight percent, the Si comprises no greater than 0.18 weight percent, the Ag comprises no greater than 0.03 weight percent, the Ni comprises no greater than 0.03 weight percent, and the V comprises no greater than 0.03 weight percent.

29. The wrought aluminum alloy product of claim 27, wherein the Cu comprises from 4.9 to 6.7 weight percent, the Mn comprises from 0.2 to 0.5 weight percent, the Zr comprises from 0.06 to 0.18 weight percent, the Sc comprises from 0.03 to 0.12 weight percent, the Ti comprises from 0.01 to 0.08 weight percent, the Fe comprises no greater than 0.22 weight percent, the Mg comprises no greater than 0.10 weight percent, the Si comprises no greater than 0.15 weight percent, the Ag comprises no greater than 0.01 weight percent, the Ni comprises no greater than 0.01 weight percent, and the V comprises no greater than 0.01 weight percent.

30. The wrought aluminum alloy product of claim 27, wherein the Cu comprises from 5 to 6.6 weight percent, the Mn comprises from 0.2 to 0.5 weight percent, the Zr comprises from 0.08 to 0.15 weight percent, the Sc comprises from 0.04 to 0.08 weight percent, the Ti comprises from 0.01 to 0.05 weight percent, the Fe comprises no greater than 0.15 weight percent, the Mg comprises no greater than 0.05 weight percent, the Si comprises no greater than 0.1 weight percent, and the balance aluminum and incidental impurities such that the product is substantially free of Ag, Ni, V and Li.

* * * * *